United States Patent [19]
Aoki

[11] Patent Number: 5,905,317
[45] Date of Patent: *May 18, 1999

[54] VIBRATION INSULATING DEVICE

[75] Inventor: Kazushige Aoki, Isehara, Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/651,539

[22] Filed: May 22, 1996

[30] Foreign Application Priority Data

May 23, 1995 [JP] Japan .................................. 7-123752

[51] Int. Cl.$^6$ ............................ H02K 5/24; H02K 33/00; H02K 9/10
[52] U.S. Cl. ..................... 310/51; 318/114; 267/140.14
[58] Field of Search ................. 310/15, 51; 318/114, 318/115, 127, 128; 248/638; 267/140.14, 140.15

[56] References Cited

U.S. PATENT DOCUMENTS

| | | | |
|---|---|---|---|
| 4,648,576 | 3/1987 | Matsui | 248/636 |
| 4,650,170 | 3/1987 | Fukushima | 267/140.1 |
| 4,666,016 | 5/1987 | Abe et al. | 180/291 |
| 4,929,874 | 5/1990 | Mizuno et al. | 318/128 |
| 4,963,804 | 10/1990 | Geiger | 318/460 |
| 5,018,698 | 5/1991 | Tobias | 248/550 |
| 5,098,119 | 3/1992 | Williams et al. | 280/707 |
| 5,133,527 | 7/1992 | Chen et al. | 248/550 |
| 5,260,896 | 11/1993 | Iwasaki | 364/724.19 |
| 5,369,348 | 11/1994 | Gennesseaux | 318/623 |
| 5,388,812 | 2/1995 | Kojima et al. | 267/140.14 |

FOREIGN PATENT DOCUMENTS

| | | |
|---|---|---|
| 4123254A1 | 1/1983 | Germany . |
| 4104168C1 | 2/1991 | Germany . |
| 4333145A1 | 3/1994 | Germany . |
| 4333157A1 | 3/1994 | Germany . |
| 4333384A1 | 3/1994 | Germany . |
| 4402086A1 | 7/1994 | Germany . |
| 19612677A1 | 11/1996 | Germany . |
| 03-024338 | 2/1991 | Japan . |
| 07191760 A | 7/1995 | Japan . |
| 2 133 582 | 7/1984 | United Kingdom . |
| 2 296 307 | 6/1996 | United Kingdom . |

*Primary Examiner*—Clayton LaBalle
*Attorney, Agent, or Firm*—Foley & Lardner

[57] ABSTRACT

A fluid sealed type vibration insulating device which is interposed between a vibrating object and a structural member and generates controlled vibrations for reducing vibrations of the structural member caused by the vibrating object. The vibration insulating device includes a controller which judges whether the device goes abnormal according to signals from sensors and executes a counter process for meeting with the generated abnormality.

23 Claims, 15 Drawing Sheets

VIBRATION INSULATING DEVICE

BACKGROUND OF THE INVENTION

The present invention relates to improvements in a device for supporting a vibration generating source such as an engine of a vehicle while insulating its vibrations, and more particularly to a vibration insulating device provided with a function for executing an adaptive maneuver when trouble is generated in the device.

Various vibration insulating devices have been proposed and are in practical use. Japanese Patent Provisional Publication No. 3-24338 discloses a fluid sealed type vibration insulating device which is provided with a fluid chamber defined by a supporting elastomer and a moveable plate. The fluid chamber is filled with fluid and is changed in volume by displacing the movable plate through an electromagnetic actuator so as to generate a control force for canceling force transmitted to the vibration insulating device.

However, such conventional vibration insulating devices have not been arranged to detect abnormality in their systems such as a degradation operation and to compensate for the generated abnormality. Therefore, in order to sufficiently ensure the reliability of the system, the conventional vibration insulating devices have had to be formed by highly durable parts although such parts are expensive.

SUMMARY OF THE INVENTION

It is an object of the present invention to provide an improved vibration insulating device having has functions to detect abnormalities in its operation and to compensate for the detected abnormality. Futhermore, such functions are ensured without using expensive parts.

A vibration insulating device according to the present invention is interposed between a vibrating object and a structural member. The vibration insulating device comprises a vibration insulating source which generates controlled vibration according to a drive signal. A reference signal generating means detects a vibrating condition of the controlled vibration generating device and outputs a reference signal indicative of the vibrating condition. A residual vibration detecting means detects a residual vibration of the structural member and outputs a residual vibration signal indicative of the residual vibration. A controlling means generates the drive signal according to the reference signal and the residual signal so as to reduce the vibration of the structural member. An abnormality detecting means detects abnormality of said controlled vibration generating device. A control changing means changes the operating condition of the controlling means according to the detection result of the abnormality detecting means.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 11, there is shown a first embodiment of a vibration insulating device according to the present invention.

Figure 1:
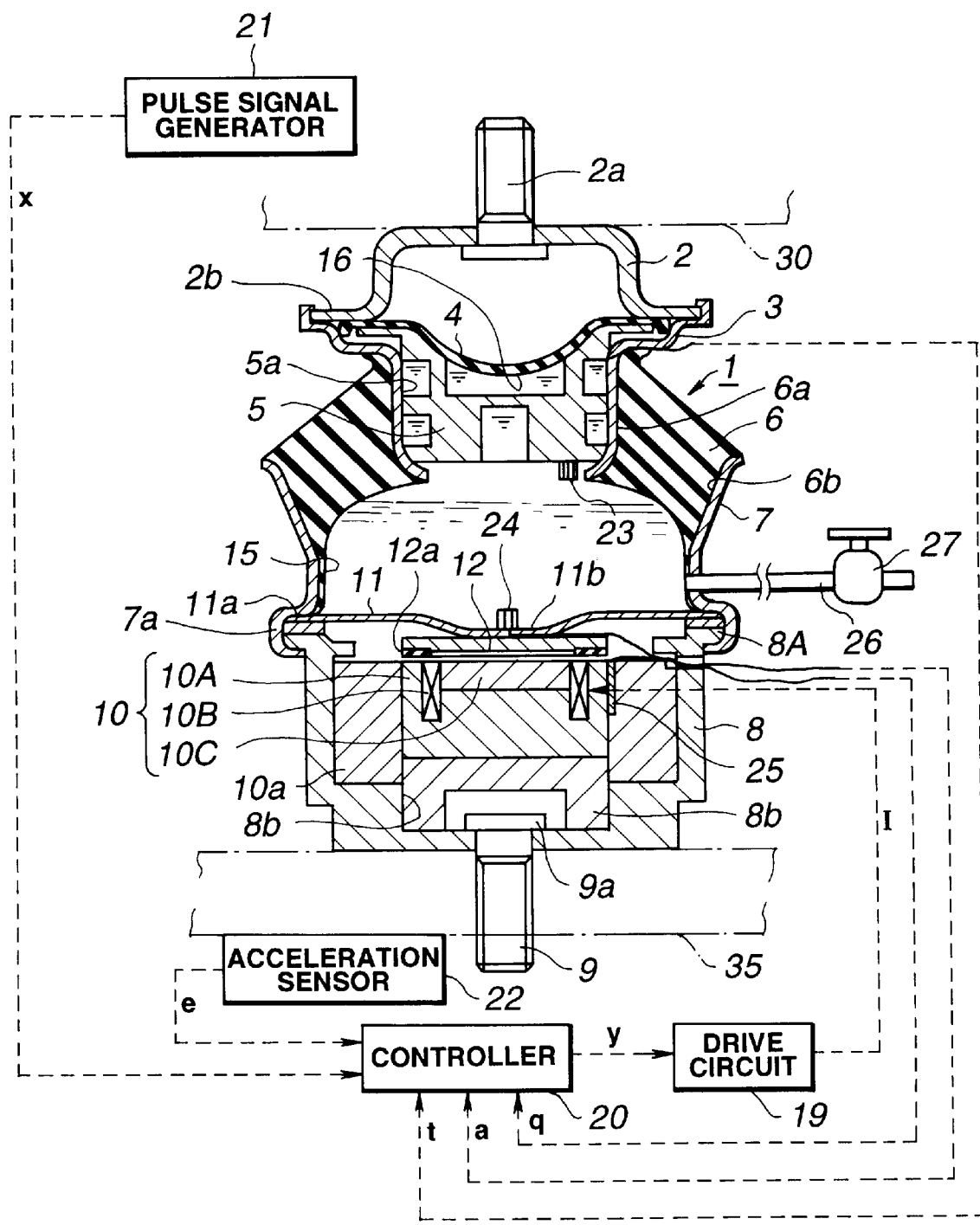
FIG. 1 is a cross-sectional view which shows a structure of a first embodiment of a vibration insulating device according to the present invention.

FIG. 1 shows the first embodiment of the vibration insulating device which is applied to a so-called active engine mount 1. The engine mount 1 is arranged to actively decrease vibrations transferred from an engine 30 to a supporting member (or structural member) 35 fixed to a vehicle body. The engine mount 1 is of a fluid sealed type and an electromagnetic drive type. The engine mount 1 comprises an installation bolt 2a through which the engine mount 1 is connected to the engine 30. Integrally connected with the installation bolt 2a is an installation part 2 formed into a cup-shape. The installation part 2 forms a hollow by its inner surface and has an open round peripheral 2b. The open round peripheral 2b of the installation part 2 is caulked to an upper end portion of an inner cylinder 3.

A diaphragm 4 is disposed inside of the inner cylinder 3 so as to divide an inner space defined by the installation part 2 and the inner cylinder 3 into upper and lower parts. An outer periphery of the diaphragm 4 is clamped between the installation part 2 and the inner cylinder 3 by means of a caulking. An orifice construction part 5 is disposed in the inner cylinder 3 and under the diaphragm 4.

A supporting elastomer 6 of a generally cylindrical shape is formed such that the inner surface 6a is higher than an outer surface 6b in height level along the axial direction. An inner surface 6a of the supporting elastomer 6 is valcanizedly connected to an outer surface of the inner cylinder 3. The outer surface 6b of the supporting elastomer 6 is vulcanizedly connected to an inner surface of an outer cylinder 7.

A lower end portion 7a of the outer cylinder 7 is caulked with a flange portion 8A of an actuator case 8. The actuator case 8 is formed into a cup-shape which is cylindrical and upwardly opened. An installation bolt 9 for installing the engine mount 1 to the structural member 35 is projected from a lower end surface of the actuator case 8. A head portion 9a of the installation bolt 9 is received in a hollow portion of a cap 8b which is engaged with a depressed portion 8a of the actuator case 8.

Furthermore, an electromagnetic actuator 10 is fittingly disposed in the actuator case 8. The electromagnetic actuator 10 is constituted of a cylindrical yoke 10A which is fixed to an upper surface of the cap 8b so as to be coaxial with the actuator case 8, an exciting coil 10B which is a circular coil wound round the vertical axis in the yoke 10A, and a permanent magnet 10C which is fixed to an upper surface of a part surrounded by the exciting coil 10B so as to form a polarity in the vertical direction. An adapter 10a for fixing the electromagnetic actuator 10 is disposed between the inner peripheral surface of the actuator case 8 and an outer peripheral surface of the electromagnetic actuator 10.

A plate spring 11 made of a metal disc is disposed above the electromagnetic actuator 10 so as to cover an opening of the actuator case 8. An outer peripheral portion 11a of the plate spring 11 is integrally clamped between the flange portion 8A of the actuator case 8 and the lower end portion 7a of the outer cylinder 7. The plate spring 11 functioning as an elastic plate having a non-linear type spring characteristic in that a spring constant is changed according to its elastic deformation amount. A disc-shaped magnetic path member 12 functioning as a movable plate is made of a magnetizable material such as iron and is fixed to a center portion 11b of a lower surface of the plate spring 11 by means of a rivet or the like so as to form a predetermined clearance relative to the upper surface of the electromagnetic actuator 10. A ring-shaped stopper 12a made of rubber is connected to a peripheral portion of a lower surface of the magnetic path member 12. The stopper 12a is slightly projected from the lower surface of the magnetic path member 12 so as to prevent the magnetic path member 12 from directly colliding with the electromagnetic actuator 10.

Furthermore, a main fluid chamber 15 is defined by the lower surface of the supporting elastomer 6 and the upper surface of the plate spring 11. An auxiliary fluid chamber 16 is defined by the diaphragm 4 and the orifice construction member 5. The orifice 5a formed by the orifice construction member 5 communicates the main fluid chamber 15 and the auxiliary fluid chamber 16. The main fluid chamber 15, the auxiliary chamber 16 and the orifice 15a are filled with fluid such as ethylene glycol.

The characteristics of the engine mount 1, which are determined by the shape of the passage of the orifice 5a, are adjusted to perform a high dynamic spring constant and high damping force when the shake of the engine 30 is generated during the running of the vehicle, that is, when the engine 30 is vibrated within a range 5–15 Hz.

The exciting coil 10B of the electromagnetic actuator 10 is electrically connected through a harness (not shown) with a drive circuit 19 constituted by a H-type bridge circuit. The drive circuit 19 is connected through a harness (not shown) with a controller 20 functioning as an electromagnetic actuator controlling means. The drive circuit 19 supplies a control electric current I corresponding to the drive signal y in direction and magnitude from the controller 20 to the exciting coil 10B. The controller 20 includes a microcomputer, various interface circuits, an A/D converter, a D/A converter and an amplifier 50. When the controller 20 detects that the engine 30 is generating the idle vibration or high-frequency vibrations such as that of echo sound vibration, the controller 20 generates a control vibration and supplies it to the engine mount 1 so that the vibration generated by the engine 30 is not transferred to the structural member 35, More specifically the exciting force inputted to the engine mount 1 due to the vibration of the engine 30 is canceled by the control force generated by the electromagnetic force of the electromagnetic actuator 10. The generation of the control vibration is executed by generating the drive signal y and supplying it to the drive circuit 19.

When the engine mount 1 is applied to a reciprocated four cylinder engine, the idle vibration and the echo vibration are mainly caused by the transmission of an engine vibration of a second component of the engine rotation through the engine mount 1 to the structural member 35. Accordingly, it is possible to reduce the vibration transmitting ratio by generating and outputting the drive signal y upon synchronizing the signal with the secondary component of the engine rotation.

A pulse signal generator 21 is installed to the engine 30 and is electrically connected to the controller 20. The pulse signal generator 21 generates an impulse signal synchronized with the rotation of a crankshaft of the engine 30, for example, once by each 180 angle rotation of the crankshaft in case of the reciprocated four cylinder engine, and outputs the impulse signal as a reference signal x. The reference signal x is supplied to the controller 20 as a signal representative of a vibration generated at the engine 30. An acceleration sensor 22 is fixedly installed to the structural member 35 in the vicinity of the connecting portion of the engine mount 1. The acceleration sensor 22 detects a vibration condition of the structural member 35 in the form of an acceleration and outputs a residual vibration signal e. The residual vibration signal e is supplied to the controller 20 as a signal representative of a vibration after the interference by the engine mount 1.

The controller 20 generates and outputs the drive signal y on the basis of the reference signal x and the residual vibration signal e according to the Filtered-X LSM algorithm, more particularly to the synchronized Filtered-X LSM algorithm. That is, the controller 20 includes an adaptive digital filter W which variably changes a filter coefficient $W_i$ where i=0, 1, 2, ... , I−1, and I is a number of tap. By each predetermined sampling-clock interval from a time the newest reference signal x is inputted, the filter coefficient $W_i$ of the adaptive digital filter W is in turn outputted as a drive signal y, and an appropriate updating process of the filter coefficient $W_i$ of the adaptive digital filter W is executed according to the reference signal x and the residual vibration signal e so as to reduce the vibration transmitted from the engine 30 to the engine mount 1 through the member 35.

An updating equation of the adaptive digital filter W is represented by the following equation (1) based on the Filtered-X LMS algorithm.

$$W_i(n+1) = W_i(n) - \mu R^T e(n) \tag{1}$$

wherein a term including (n) represents a value at time n, m is a coefficient called as a convergence coefficient and related to the converging speed of the filter coefficient Wi and its stability. $R^T$ is, theoretically, a Filtered-X signal obtained by filter-processing the reference signal x by means of a model transfer function filter C^which is a model of a transfer function C between the force generated at the electromagnetic actuator 10 and the acceleration sensor 22. The reference signal x is an impulse-train as a result of the application of the synchronized-type Filtered-X LMS algorithm. Accordingly, in case that an impulse responses of the transfer function filter $\hat{C}$ are in turn generated synchronizing with the reference signals x, $R^T$ corresponds to the sum of these impulse response wave forms at the time n.

Theoretically, the drive signal y is generated by filtering the reference signal x by means of the adaptive digital filter W, and this filtering process corresponds to a convolution calculation in the digital calculation. Since the reference signal x is an impulse train, by outputting each filter coefficient $W_i$ of the adaptive digital filter W as a drive signal y in turn at predetermined sampling-clock intervals from a time that the newest reference signal x is inputted, the same result is obtained as in a case that the result of the filter process is taken as a drive signal y.

On the other hand, a leakage sensor 23 for detecting that the fluid chamber 15 is filled with the fluid is fixed to a lower surface of the orifice construction member 5 of the engine mount 1. The leakage sensor 23 may be an $O_2$ sensor for detecting oxygen, a pressure sensor for detecting pressure of the fluid, a switch which is set in ON condition when the fluid normally fills the fluid chamber 15, or a flout switch for detecting a height level of the fluid. The leakage sensor 23 outputs a signal q indicative of a logical value "1" to the controller 20 when the fluid chamber 15 is filled with the fluid, and outputs the signal q indicative of a logical value "0" to the controller 20 when the fluid chamber 15 is not filled with fluid.

An acceleration sensor 24 for detecting a vertical acceleration of the center portion 11b is fixed to an upper surface of the center portion 11b of the sheet spring 11 of the engine mount 1. The acceleration sensor 24 outputs a signal a indicative of the acceleration of the center portion 11b to the controller 20. A temperature sensor 25 is disposed in the vicinity of the yoke 10a of the electromagnetic actuator 10 in the adapter 10a. The temperature sensor 25 detects the temperature of the electromagnetic actuator 10 and outputs a signal t indicative of the detected temperature to the controller 20.

An end of a conduit 26 is inserted into the fluid chamber 15, and the other end of the conduit 26 is connected with a manual selector valve 27. That is, the engine mount 1 of this embodiment is arranged so that the fluid in the fluid chamber 15 is discharged through the conduit 26 by opening the selector valve 27. Usually, the selector valve 27 is closed so that the fluid is sealingly filled in the fluid chamber 15.

The controller 20 is arranged to execute the process for detecting that the active engine mount 1 is abnormal according to the inputted signals and the process for meeting with (executing adaptive maneuver against) the generated abnormality.

More particularly, the process for detecting the abnormality includes a leakage abnormality detecting process for detecting from the leakage detection signal q as to whether the fluid in the fluid chamber 15 has leaked, an operation abnormality detecting process for detecting from the acceleration detection signal a as to whether the center portion 11b and the magnetic path member 12 cannot be displaced, an effect shortage abnormality detecting process for detecting from the residual vibration signal e as to whether the vibration reducing effect is not obtained by the execution of the vibration reducing control, a temperature abnormality detecting process for detecting from the temperature detection signal t whether the electromagnetic actuator 10 is put in a high temperature condition, and a collision abnormality detecting process for detecting from the acceleration detection signal a whether the magnetic path member 12 collides with the electromagnetic actuator 10 during the vertical movement of the magnetic path member 23.

Further, the maneuver process for executing an adaptive maneuver against the various abnormalities includes a control disabling process for completely forbidding the execution of the vibration reducing process of the engine mount 1 and a level reducing process for reducing the level of the drive signal y. The control forbidding process is executed when at least one of the leakage abnormality, the operation abnormality or the effect shortage abnormality is detected. The level reducing process is executed when one of the temperature abnormality or the collision abnormality is detected. Practically, the controller 20 executes the control disabling process and the level reducing process when the above-mentioned abnormality is detected. Further, the controller 20 is arranged to turn on an alarm lamp or change the color of the alarm lamp by each maneuver so as to inform the generation of the abnormality to operators.

Next, the manner of operation of the first embodiment according to the present invention will be discussed.

When the engine 30 is shaken, the engine mount 1 functions as a supporting device having a high spring constant and a damping force due to the proper selection of the orifice 5a. Accordingly, the shaking of the engine 30 is damped by the engine mount 1, and the magnitude of the vibration level to the member 35 is decreased. In such a case, it is not necessary to displace the magnetic passage member 13.

On the other hand, when the engine mount 1 receives vibration whose frequency is greater than the idle vibration frequency such that the fluid in the orifice 5a is set in a static condition and it becomes impossible to move the fluid between the fluid chamber 15 and the auxiliary fluid chamber 16, the controller 20 generates the active control force for reducing the vibration by executing a predetermined calculation process and outputting the drive signal y to the electromagnetic actuator 10.

With reference to the flowchart of FIG. 2, the process executed by the controller 20 during the generation of the idle vibration or echo sound vibration will be discussed in detail hereinafter.

First, at a step S101, the controller 20 executes predetermined initialization.

At a step S102, the controller 20 calculates reference signals $R^T$ for one cycle on the basis of the transfer function filter $\hat{C}$.

At a step S103, the counter i is reset (i=0).

At a step S104, a filter coefficient $W_i$ in the i-th order of the adaptive digital filter W is outputted as the drive signal y.

At a step S105, the controller 20 reads the residual vibration signal e.

At a step S106, a counter j is reset (j=0).

At a step S107, the i-th order filter coefficient $W_i$ of the adaptive digital filter W is updated according to the equation (1).

At a step S108, the controller 20 decides whether the next reference signal x has been input. When the decision at the step S108 is NO, the routine proceeds to a step S109 in order to execute the updating process of the next filter coefficient or the outputting process of the drive signal y.

At the step S109, the controller 20 decides as to whether the content of the counter j reaches the output times (frequency) Ty or not, more particularly, as to whether the content of the counter j reaches a value subtracting 1 from the output times Ty or not. When the decision at the step S109 is "NO", the routine proceeds to a step S110 wherein the content of the counter j is incremented by 1 (j=j+1). Following this, the routine returns to the step S107 to repeat the above-mentioned loop.

When the decision at the step S109 is "YES", that is, when the controller 20 decides that the updating process of the necessary number of the filter coefficients as drive signals is finished, the routine proceeds to a step S111 wherein the DC (direct current) components of the sequence of the filter coefficients $W_i$ are eliminated. Following this, the routine proceeds to a step S112 wherein the controller 20 decides as to whether at least one of the filter coefficients $W_i$ is greater than an upper limit $W_{max}$ or not, wherein the upper limit $W_{max}$ is an upper limit of the drive signal y corresponding to an outputtable control force at the engine mount 1.

When the decision at the step S112 is "NO", the routine proceeds to a step S113 wherein the correction coefficient β is set at 1 (β=1). When the decision at the step S112 is "YES", the routine proceeds to a step S114 wherein the correction coefficient β is set at a value which is larger than 0 and smaller than 1. More particularly, at the step S114, the correction coefficient β is set at a value whose multiple with each filter coefficient $W_i$ is smaller than the upper limit $W_{max}$ and is nearly the upper limit $W_{max}$, as possible.

At a step S115, the correction coefficient β is multiplied with each filter coefficient $W_i$, and the filter coefficient $W_i$ is replaced with the corrected filter coefficient ($W_i=W_i\times\beta$).

The processing from the step S111 to the step S115 is executed to avoid the degradation of the vibration reduction control. That is, if the drive signal y is generated by using the filter coefficient $W_i$ updated at the step S107 as it is, in case that the outputable drive signal y has an upper limit on the viewpoint of the characteristic of the controller 20 and the electromagnetic actuator and the like, the drive signal greater than the upper limit value is forcibly corrected to the upper limit valve and the drive signal y smaller than the upper limit is outputted as it is. Accordingly, a high-frequency component, which does not exist practically, is convoluted, and therefore the vibration reducing control is degraded.

At a step S116, the counter i is incremented by 1 (i=i+1), and the routine stays at the step S116 until a predetermined time period corresponding to an interval of a predetermined sampling clock after the execution of the step S104 has elapsed. Following this, the routine returns to the step S104 to repeat the above-mentioned processes.

When the decision at the step S108 is "YES", the routine proceeds to a step S117 wherein the content of the counter i is stored as a newest output frequency $T_y$, more particularly, the sum of the counter value i and 1 is stored since the counter i starts from 0. Following this, the routine returns to the step S102 to repeat the above-mentioned processing.

Figure 2:
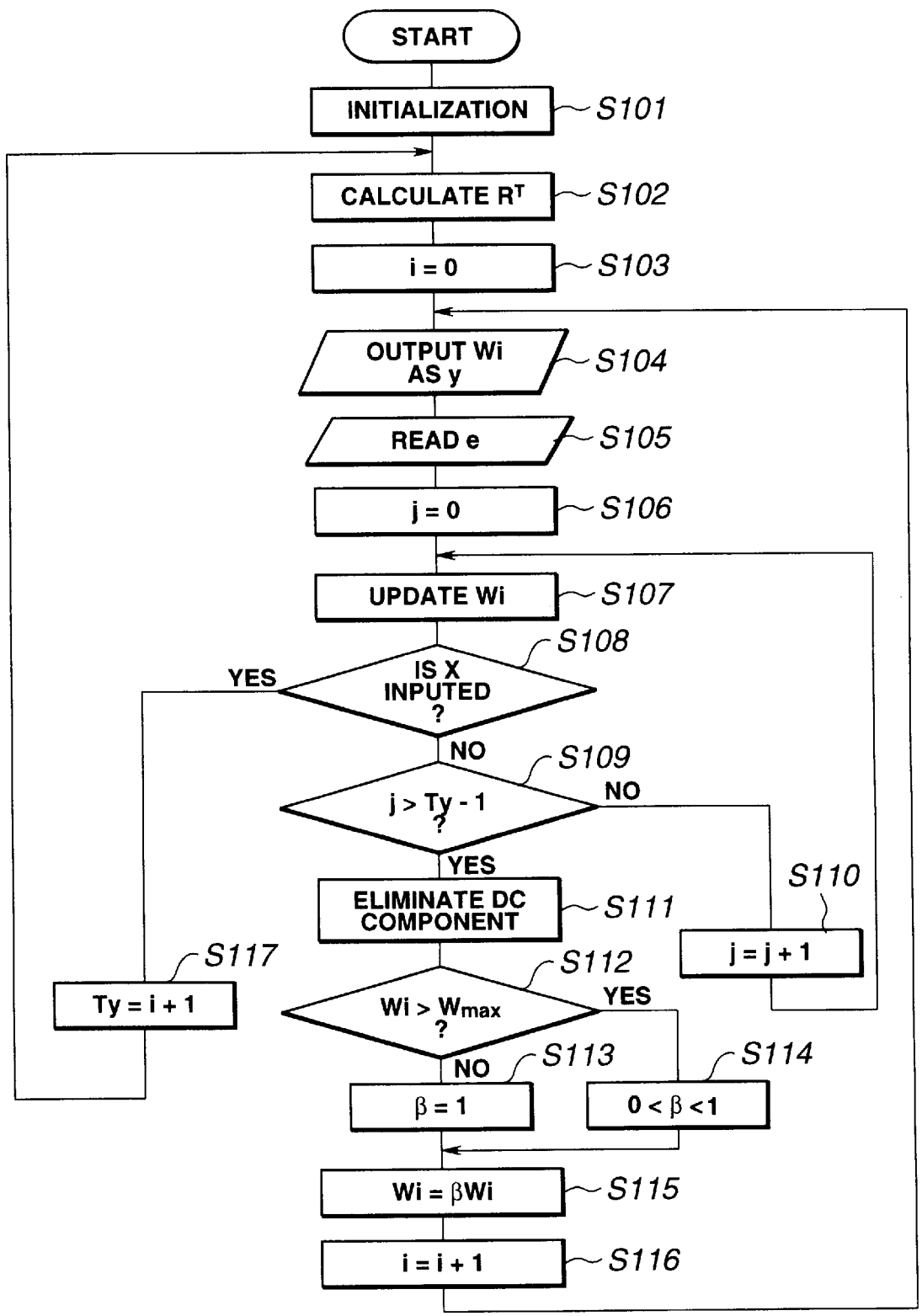
FIG. 2 is a flowchart of a vibration reducing process executed by a controller of the first embodiment.
Figure 3:
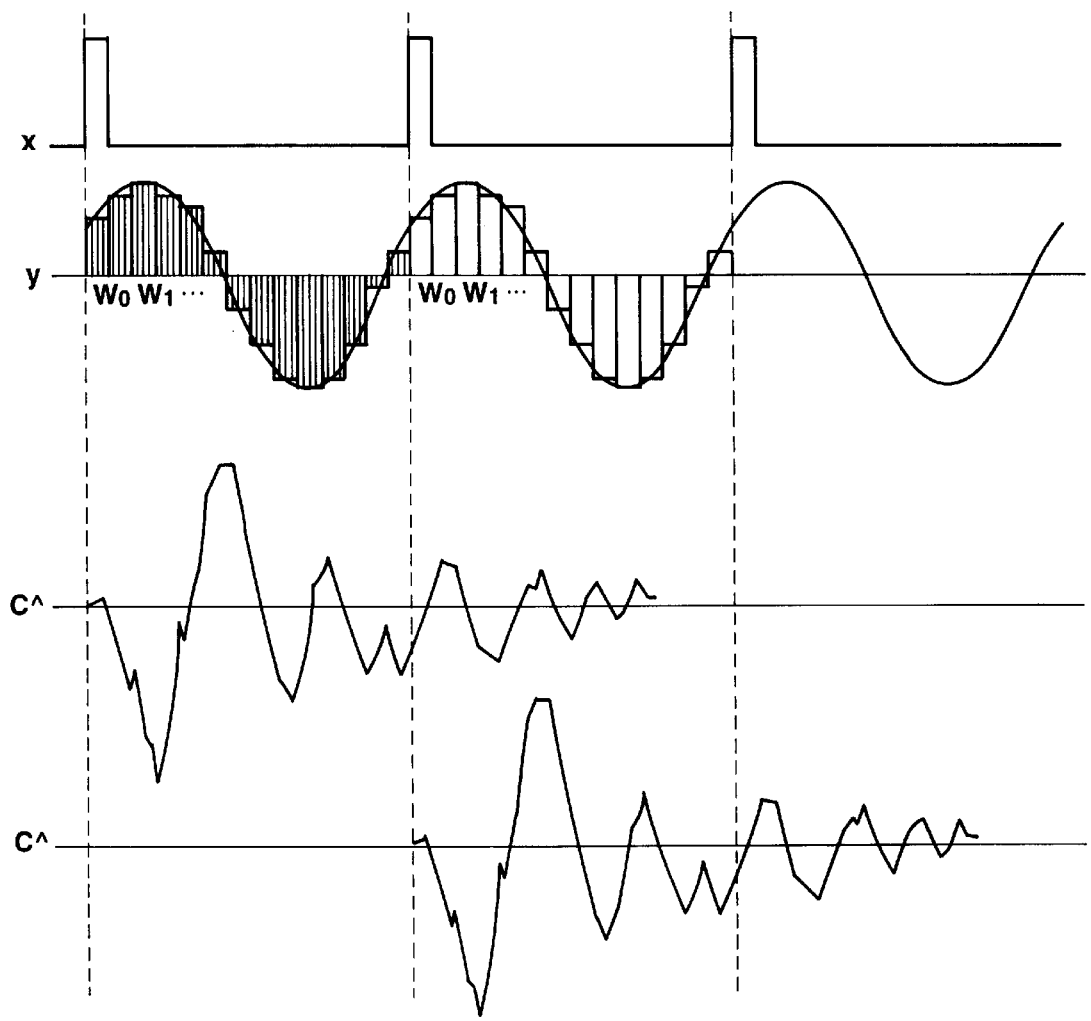
FIG. 3 is a graph which shows wave-forms of a reference signal, a drive signal and a transfer function filter C^.

By repeatingly executing the program routine shown in FIG. 2, the filter coefficient $W_i$ of the adaptive digital filter W is in turn supplied as the drive signal y from a time that the reference signal x is inputted at sampling clock intervals from the controller 20 to the drive circuit 19, as shown in FIG. 3 which represents a relationship among the reference signal x, the drive signal y and the transfer function filter C^.

As a result of the supplement of the drive signals y, although the magnetic force corresponding to the drive signal y is generated at the exciting coil 10B, the predetermined magnetic force due to the permanent magnet 10C has already been applied to the magnetic path member 12. Therefore, it may be considered that the magnetic force due to the exciting coil 10B functions to strengthen or weaken the magnetic force of the permanent magnet 10C. That is, in a condition that the drive signal y is not supplied to the exciting coil 10C, the magnetic path member 12 is displaced at a neutral position where the supporting force of the plate spring 11 and the magnetic force of the permanent magnet 10C are balanced. When the drive signal y is supplied to the exciting coil 10B in this neutral condition, the magnetic path member 12 is displaced in the direction that the clearance relative to the electromagnetic actuator 10 is increased if the magnetic force generated at the exciting coil 10B by the drive signal y is directed against the direction of the magnetic force of the permanent magnet 10C, the magnetic path member 12. Inversely, if the direction of the magnetic force generated at the exciting coil 10B is the same as that of the magnetic force of the permanent magnet 10C, the magnetic path member 12 is displaced so that the clearance relative to the electromagnetic actuator 12 is decreased.

Thus, the magnetic path member 12 is movable in the right and inverse directions. Since the volume of the main fluid chamber 15 is changed by the displacement of the magnetic path member 12 and the expansion spring of the supporting elastomer 6 is deformed due to this volume change, the supporting force active in the right and inverse directions is generated at the engine mount 1. Each filter coefficient $W_i$ of the adaptive digital filter W is in turn updated by the equation according to the synchronized type Filtered-X LMS algorithm. Therefore, after each filter coefficient $W_i$ of the adaptive digital filter W is converged into an optimum value when a predetermined time has elapsed, the idle vibration and the echo sound transferred from the engine 30 through the engine mount 1 to the structural member 35 is decreased by supplying the drive signal y to the engine mount 1.

Next, each abnormality detection process and the counterplan process against the abnormality detection will be discussed with reference to FIGS. 4 to 11.

Figure 4:
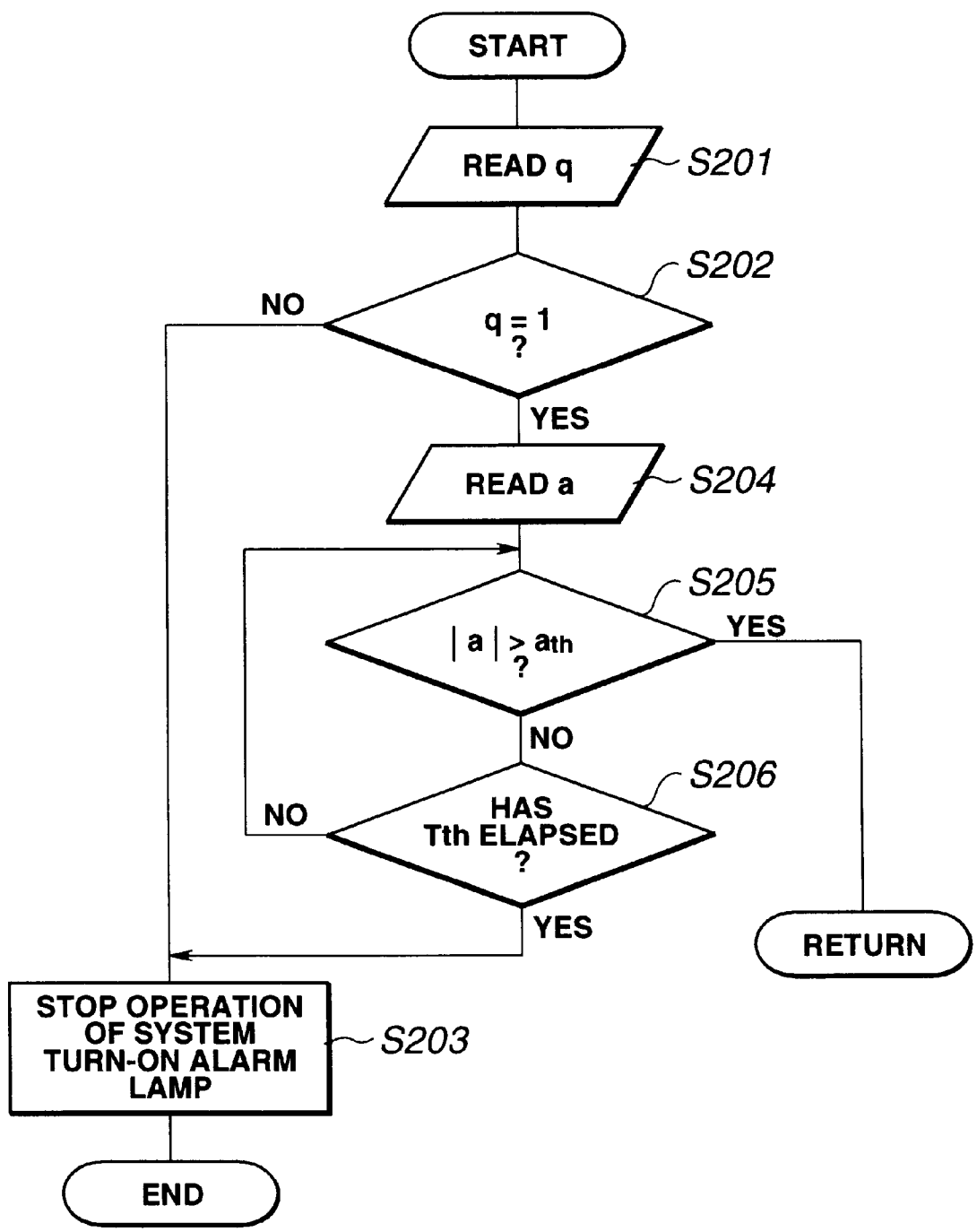
FIG. 4 is a flowchart which shows processing executed by the controller of the first embodiment.

FIG. 4 shows a flowchart for processing a leakage abnormality detection and an operation abnormality detection, and maneuvers for the abnormality detection.

This detection process shown in FIG. 4 is executed just after the turning-on of the ignition switch and before the start of the vibration reducing process shown in FIG. 2.

At a step S201, the controller 20 reads the leakage detection signal q outputted from the leakage sensor 23.

At a step S202, the controller 20 decides as to whether the detection signal q is the logical value "1" or not. When the decision at the step S202 is "YES", the fluid chamber 15 is sufficiently filled with the fluid and it is decided that no leakage has occurred. When the decision at step S202 is "NO", the fluid has leaked from the fluid chamber 15, and therefore the leakage abnormality has occurred such that the supporting force is not transferred to the expansion spring of the support elastic member 6 even if the magnetic path member 12 is displaced by the electromagnetic force of the electromagnetic actuator 10. Therefore, the routine proceeds to a step S203 wherein the execution of the vibration reducing process shown in FIG. 2 is stopped. Simultaneously, the operation of the system is stopped, and the alarm lamp is turned on, such as turned into red. It will be understood that the controller 20 may be arranged to previously store the kind of the abnormality and the generated point thereof during the process at the step S203.

On the other hand, when the decision at the step S202 is YES, the routine proceeds to a step S204 wherein the controller 20 reads the acceleration signal a from the acceleration sensor 24.

At a step S205, the controller 20 decides as to whether the absolute value of the acceleration signal a is greater than a predetermined threshold value $a_{th}$ or not. When the decision at the step S205 is "NO", the routine proceeds to a step S206 wherein the controller 20 decides as to whether a predetermined time period $T_{th}$ has elapsed from a first execution of the step S204 or not. When the decision at the step S206 is "NO", the routine returns to the step S204 wherein the acceleration signal a is again read. Then, the step S205 is executed.

Figure 5A:
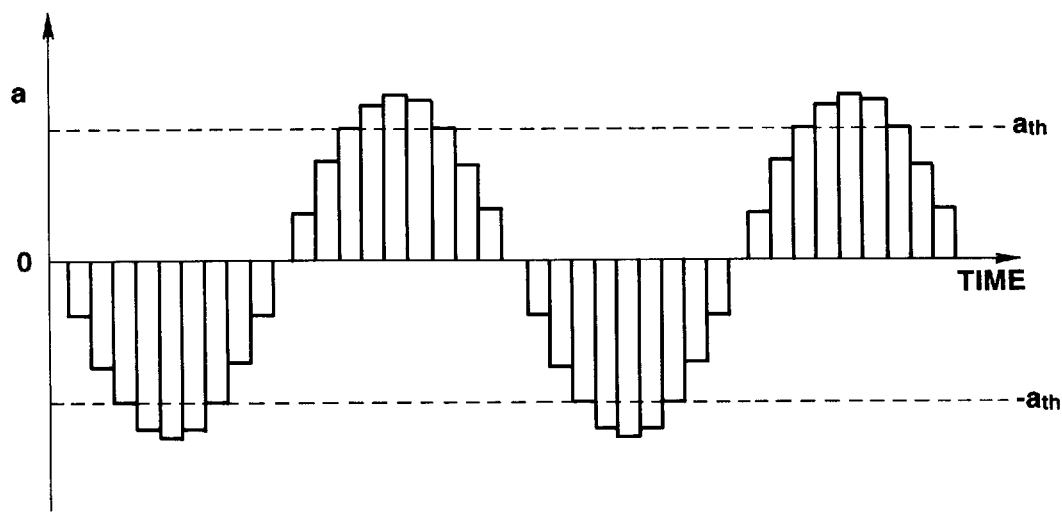
FIGS. 5A and 5B are graphs which show wave-forms for explaining the processing of FIG. 4.
Figure 5B:
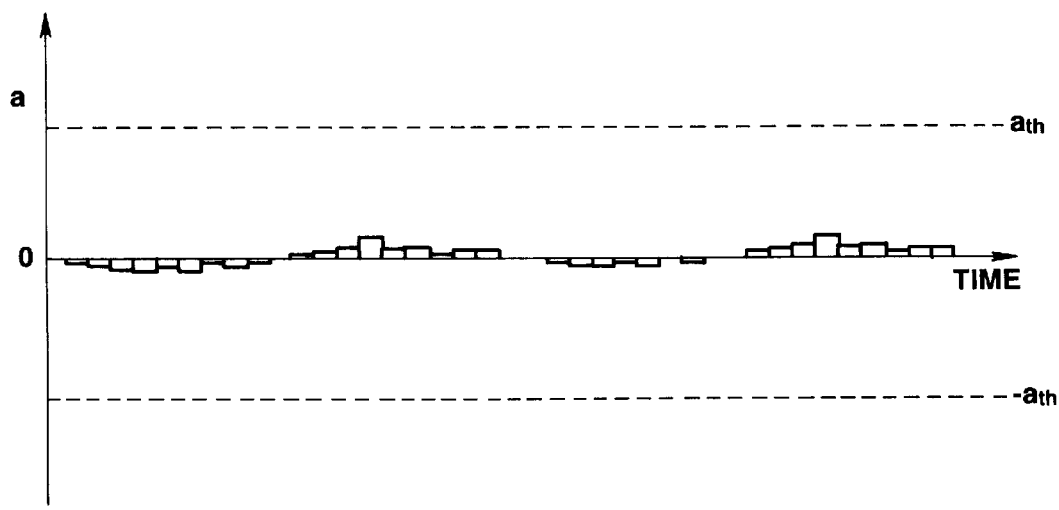

Herein, if the vibration reducing control is not executed, the control force of the electromagnetic actuator 10 is not generated. Therefore, no active displacement is generated at the center portion 11b of the plate spring 11 and the magnetic path member 12. However, if the engine 30 is operated, the magnetic path member 12 and the like generate vertical movement by the volume change of the fluid chamber 15 due to the resilient deformation of the supporting elastomer 6. The magnitude of the vertical acceleration generated at the magnetic path member 12 is generally determined according to the engine rotation speed and load. Accordingly, by determining the minimum (lowest) value of the vertical acceleration to be generated as a threshold value and by continuously monitoring the acceleration signal a throughout one cycle period of the vertical movement of the magnetic path member 12, it is possible to detect that the absolute value of the acceleration momentarily becomes greater than the threshold value $a_{th}$ as shown in FIG. 5A. Accordingly, when the absolute value of the acceleration detection signal a does not become greater than the threshold value $a_{th}$ during the monitoring for one cycle period as shown in FIG. 5B, it is decided that the center portion 11b and the magnetic path member 12 are put in a condition that they can not displace. That is, when the predetermined time $T_{th}$ used in the step S206 is set so as to be greater than a time period of one cycle of the vibration of the magnetic path member 12 and when the decision at the step S206 is "YES", it becomes possible to decide that the center portion 11b and the magnetic path member 12 do not vertically move due to the breakage or deformation of the plate spring 11 against the designed movement. Therefore, when the decision at the step S206 is "YES", the routine proceeds to the step S203 wherein the system is turned off (down) and the alarm lamp is turned on.

Thus, by detecting the generation of the abnormality in leakage and operation through the process shown in FIG. 4 before the execution of the vibration reducing process shown in FIG. 2, and by forbidding the execution of the vibration reducing process in case that the abnormality is detected, the system properly operates so that the vibration reducing control is not executed when the system is put in a condition that the active control force cannot be generated. Therefore, it is possible to avoid the unavailable calculation and the unavailable consumption of the electric power of the electromagnetic actuator 10.

Figure 8:
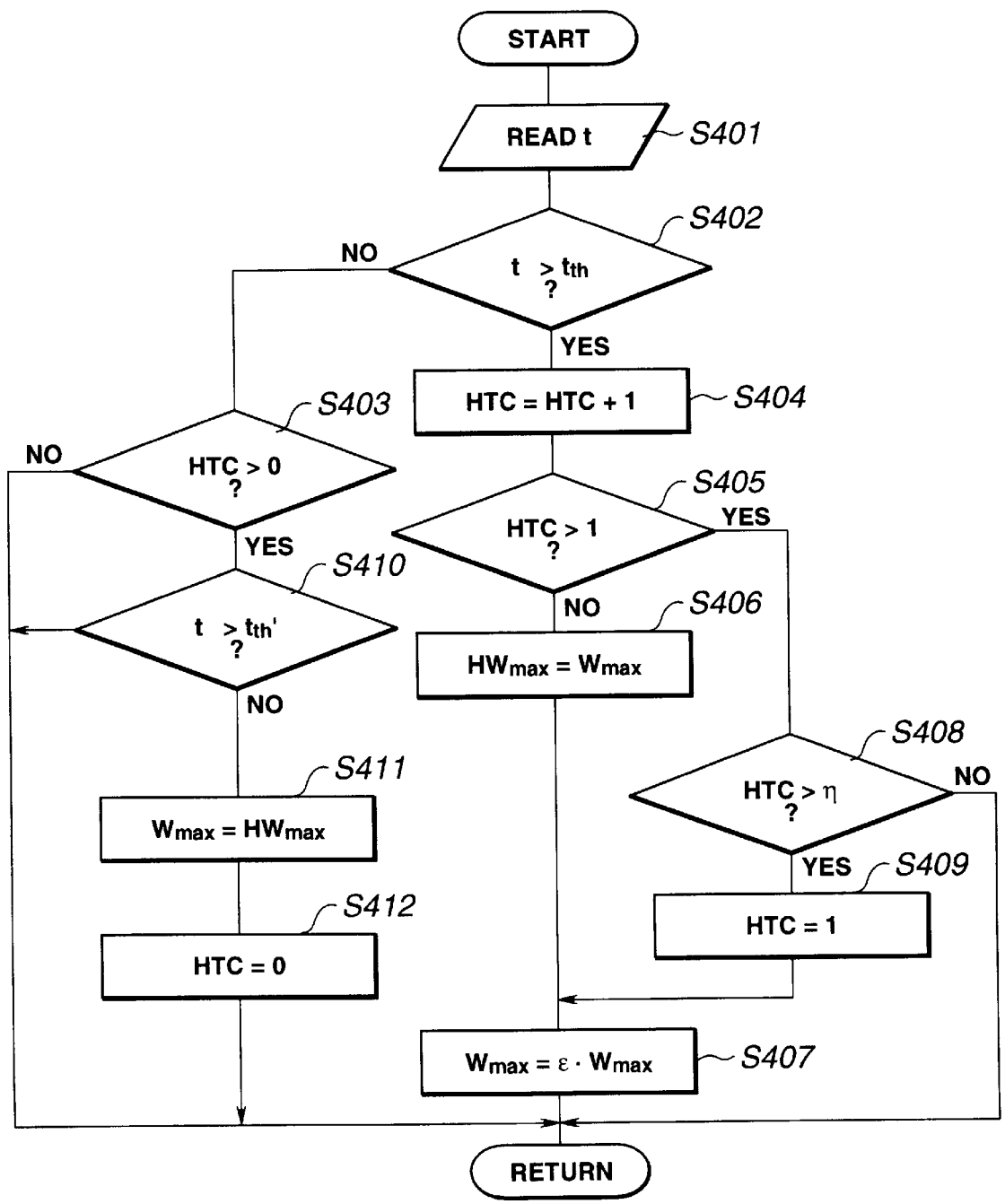
FIG. 8 is a flowchart which shows a process executed by the controller of the first embodiment.
Figure 10:
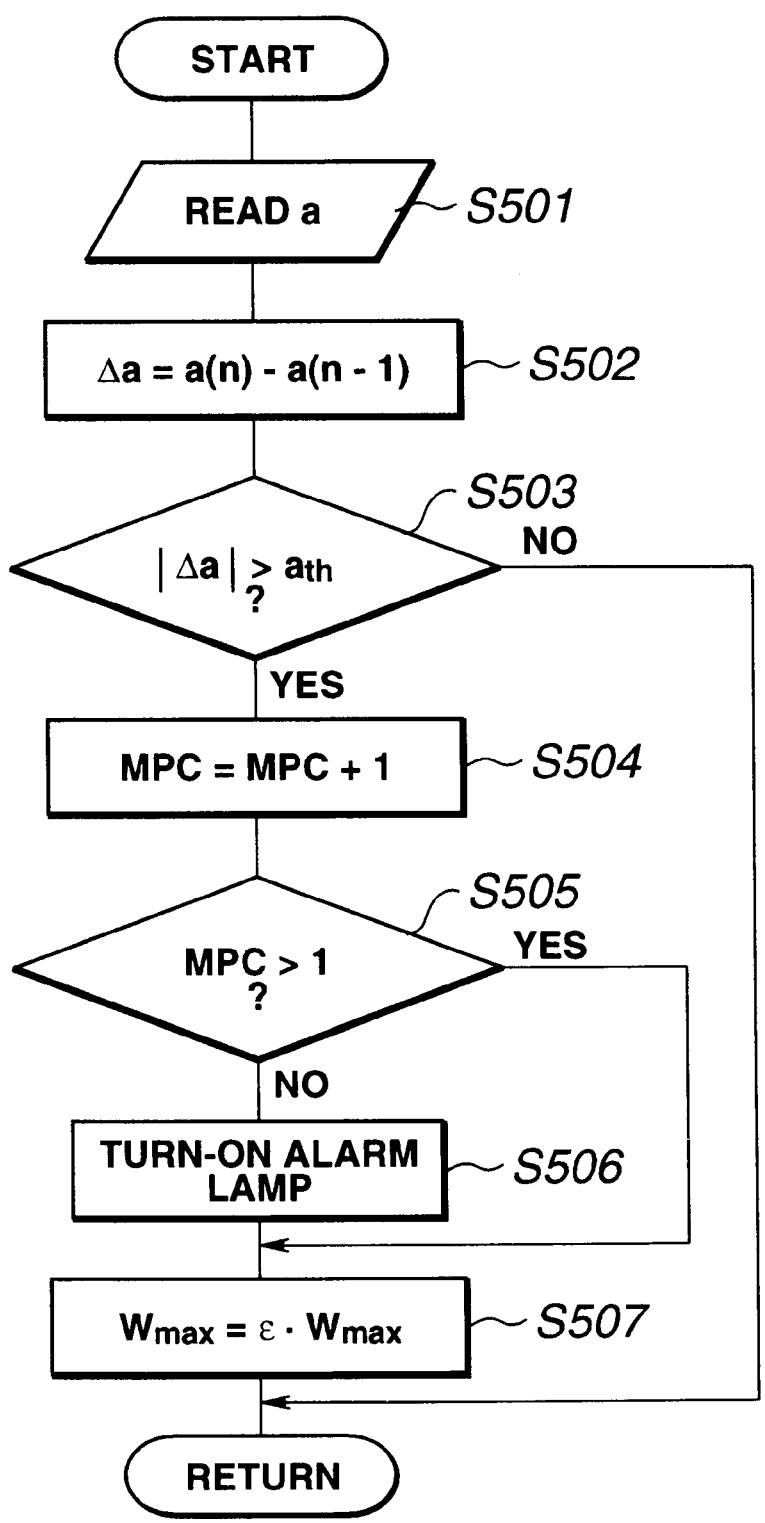
FIG. 10 is a flowchart which shows a process executed by the controller of the first embodiment.
Figure 11:
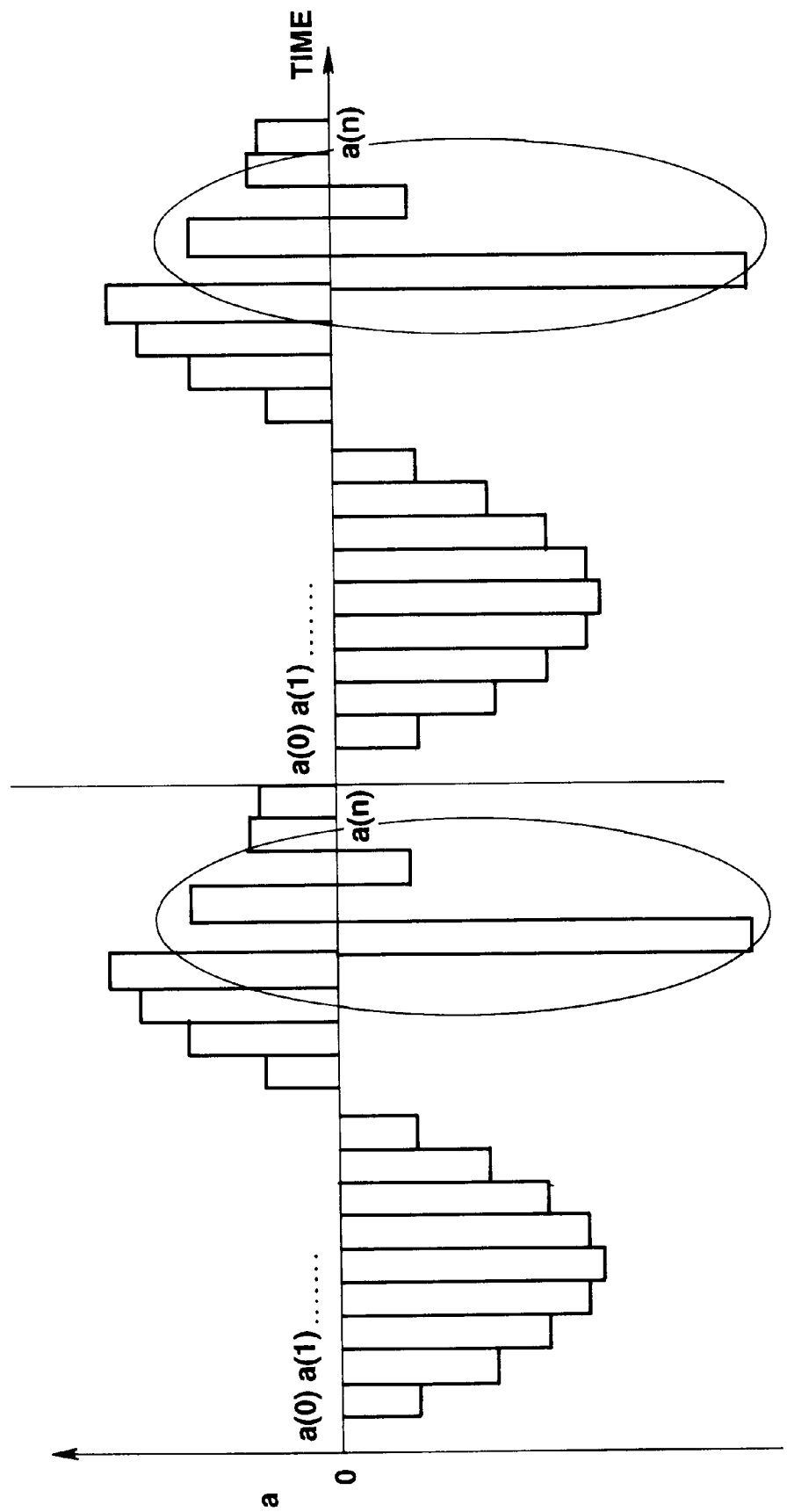
FIG. 11 is a graph which shows wave-forms for explaining the function of the processing of FIG. 10.

Further, since the alarm lamp is turned on when the controller 20 decides that the abnormality is generated, the operator is easily aware of the generation of the abnormality in the system. In case that both of the leakage abnormality and the operational abnormality are not detected, the vibration reducing process is executed, and further the processes shown in FIGS. 6, 8 and 10 are properly executed during the vibration reducing processing.

Figure 6:
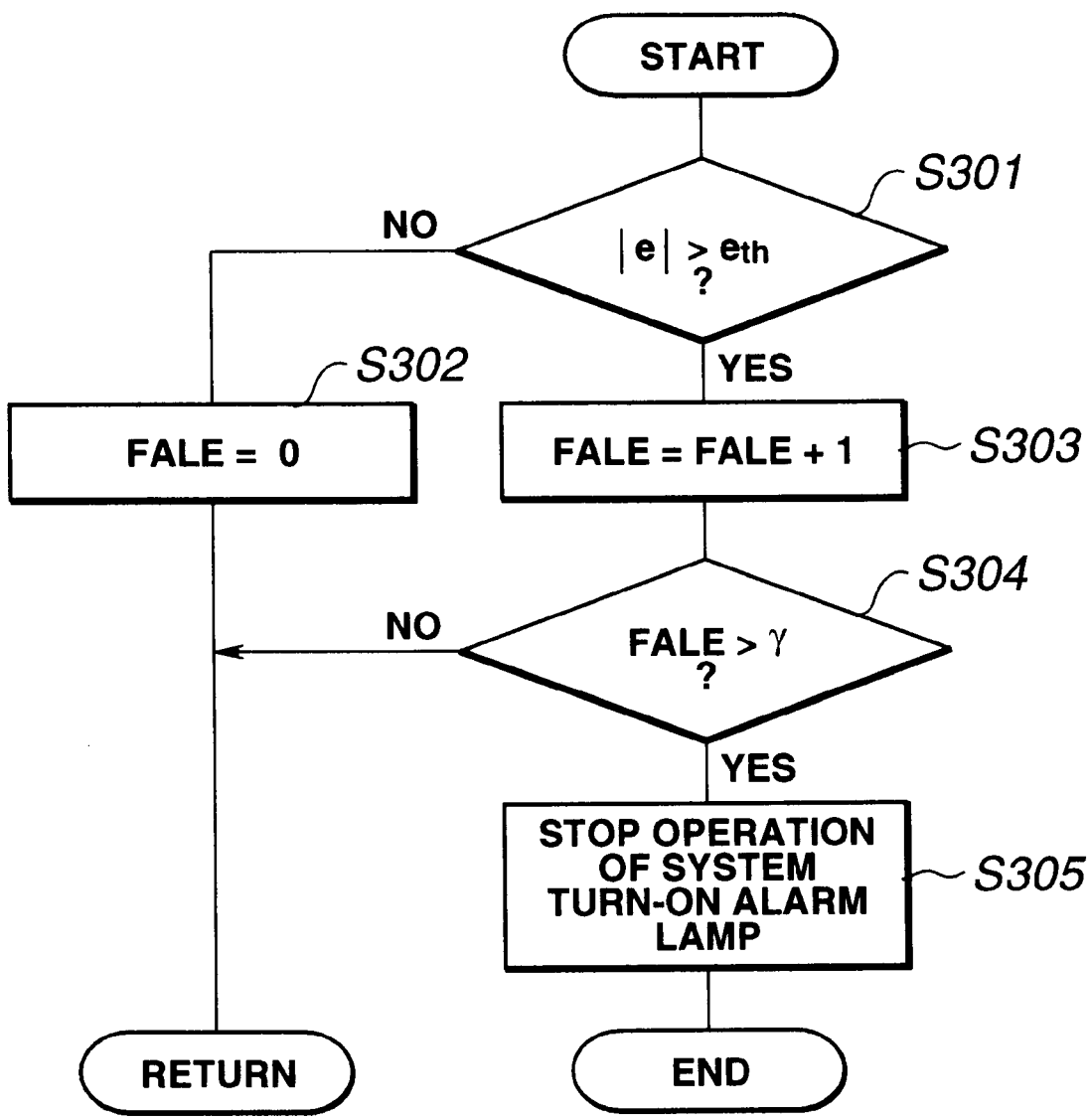
FIG. 6 is a flowchart which shows a process executed by the controller of the first embodiment.
Figure 7A:
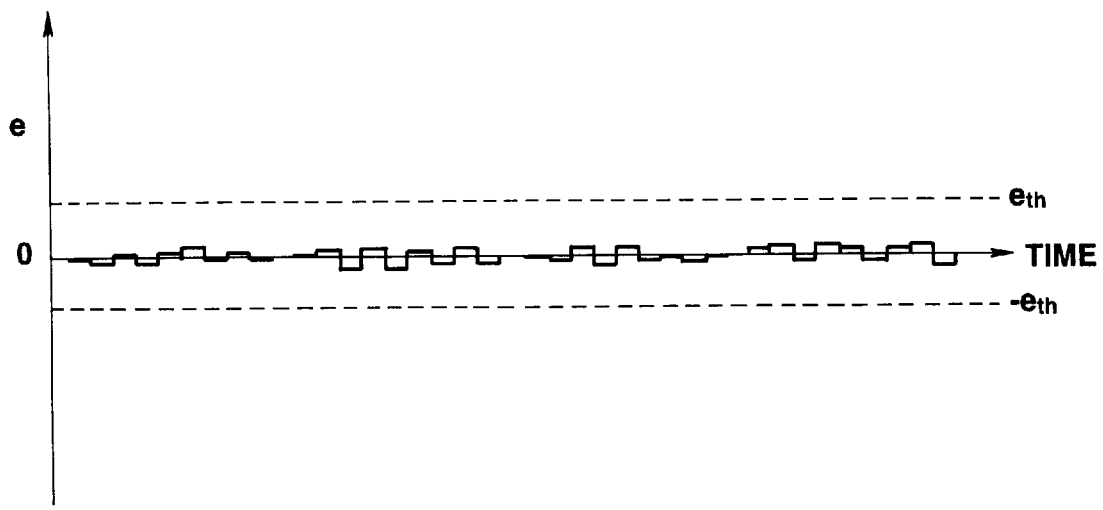
FIGS. 7A and 7B are graphs which show wave-forms for explaining the function of the processing of FIG. 6.
Figure 7B:
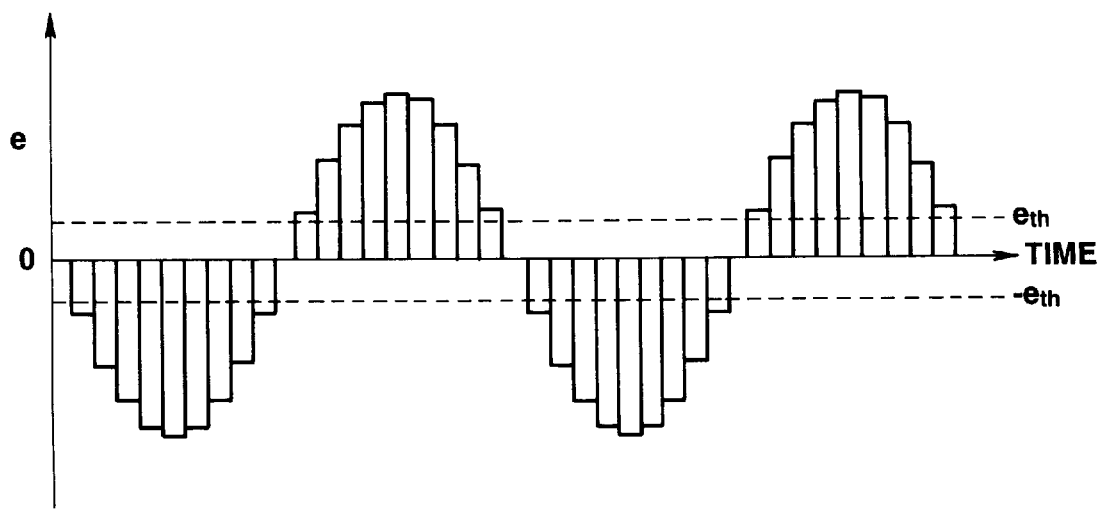

The process shown in FIG. 6 is a process for detecting the abnormality due to the shortage of the effect and for stopping the system. This process is executed as an interruption process by each finish of the process at the step S117 in the flowchart of FIG. 2. In a step S301, the controller 20 decides as to whether the absolute value of at least one of the residual vibration signals e read at the step S105 for a period corresponding to one cycle of the reference signals x is greater than the predetermined threshold value $e_{th}$ or not. When the decision at the step S301 is "NO", that is, when the level of the residual vibration signal e is small as shown in FIG. 7A, the controller 20 judges that the vibration transferred from the engine 30 to the member 35 through the vibration reducing process is sufficiently small. Therefore, the abnormality as to the shortage of the effect is not generated. Then, the routine proceeds to a step S302 wherein a counter FAIL indicative of the generation of the abnormality is reset (FAIL=0), and this interruption routine is finished.

When the decision at the step S301 is "YES", the level of the residual vibration signal e is large and therefore the vibration at the member 35 is not sufficiently reduced. Accordingly, the controller 20 judges that the vibration reducing control may not be normally executed, that is, judges that the effect shortage abnormality may be generated. Following this, the routine proceeds to a step S303 wherein the counter FAIL is incremented by 1 (FAIL=FAIL+1)

At a step S304, the controller 20 decides as to whether the counter FAIL reaches a predetermined number r such as 10 or not. When the decision at the step S304 is "NO", the abnormality detecting process of FIG. 6 is finished.

In order to improve the reliability of the abnormality detection process, the program is arranged so as not to promptly decide that the effect shortage abnormality is generated even if the decision at the step S301 is "YES". The system is arranged to avoid the incorrect decision, for example, in case that the residual signal $e_{th}$ is temporarily greater than the threshold value due to the inputted vibration from a load surface through wheels to the member 35.

When the decision at the step S304 is "YES", since the process shown in FIG. 6 is executed synchronously with the cycle period of the reference signal x, it becomes possible to decide that the residual vibration signal e becomes periodically greater than the threshold value $e_{th}$. From this decision, it is possible to decide that the effect shortage abnormality is generated even if the active control force is generated by generating the drive signal y according to the adaptive algorithm and driving the electromagnetic actuator 10 according to the drive signal y. The effect shortage abnormality will be generated by the fact that the difference between the transfer function Ĉ and the actual transfer function is increased due to the degradation of various parts of the engine mount 1.

Therefore, when the decision at the step S304 is "YES", the routine proceeds to a step S305 wherein the execution of the vibration reducing process is forbidden, the system is stopped, and the alarm lamp is turned on, such as turned to red.

By arranging the system so as to be stopped when the effect shortage abnormality is detected in the interruption process of FIG. 6 during the execution of the vibration reducing process, the output of the drive signal y is stopped under the condition that the vibration reducing effect can not be obtained. Therefore, it is possible to avoid the unavailable calculation and the unavailable consumption of the electric power of the electromagnetic actuator 10. Furthermore, when the process of FIG. 6 is executed, the normality of the operation of the system has been already checked (the active control force is generated by the processing of FIG. 4). Therefore, it becomes possible to avoid the degradation of the vibration level at the member 35 which degradation is generated by further generating the drive signal y in a condition that the vibration reducing effect is not obtained.

When the abnormality is not detected by the process of FIG. 6, the process shown in FIG. 8 is executed to detect the temperature abnormality and to solve the high temperature condition when the temperature abnormality is detected. The process is executed as an interruption processing during the execution of the vibration reducing process of FIG. 2 by a predetermined interval or by the predetermined numbers of executions of the process at the step S117.

At a step S401, the controller 20 reads a temperature detecting signal t from the temperature sensor 35.

At a step S402, the controller decides as to whether or not the temperature detection signal t is greater than a threshold value $t_{th}$ corresponding to the temperature that the electromagnetic actuator 10 is put in a high temperature condition. When the decision at the step S402 is "NO", the routine proceeds to a step S403 wherein the controller 20 decides as to whether the counter HTC is greater than 0 or not. The counter HTC counts a frequency (number of times) of the "YES" answer at the step S402. When the decision at the step S403 is "NO", the controller 20 judges that the temperature detection signal t is lately not greater than the threshold value $t_{th}$ for a predetermined time period. Accordingly, the routine of FIG. 8 is finished and returns to the vibration reducing process of FIG. 2.

In contrast, if the vibration reducing process is continued, the temperature of the electromagnetic actuator 10 becomes high. For example, if the temperature detection signal t is greater than the threshold value $t_{th}$ as at the time $t_1$ of FIG. 9, the decision at the step S402 becomes "YES". Following this, the routine proceeds to a step S404 wherein the counter HTC is incremented by 1 (HTC=HTC+1).

At a step S405, the controller 20 decides as to whether the counter HTC is greater than 1 or not. The decision at the step S405 is executed for judging as to whether the frequency of the "YES" answer at the step S402 is first or plural times. That is, when the decision at the step S402 first becomes "YES" (the decision at the step S405 is "NO"), the routine proceeds to a step S406 wherein the controller 20 stores the present upper limit value $W_{max}$ used in the step S112 of the vibration reducing process of FIG. 2, as $HW_{max}$ ($HW_{max} \leftarrow W_{max}$).

At a step S407, the upper limit value $W_{max}$ is corrected by multiplying the present upper limit value $W_{max}$ and a correction coefficient $\epsilon$ which is larger than 0 and smaller than 1 such as 0.9 ($W_{max} = W_{max} \times \epsilon$).

After the execution at the step S407, the processing of FIG. 8 is finished and the routine returns to the vibration reducing process of FIG. 2.

That is, by the execution of the process at the step S407, the upper limit value $W_{max}$ used at the step S112 is changed smaller. Accordingly, the level of the drive signal y tends to be reduced. Further, the electric current flowing through the exciting coil 10B of the electromagnetic actuator 10 is decreased. Therefore, by keeping this condition, the temperature of the electromagnetic actuator 10 is gradually decreased and becomes normal.

When the frequency of the "YES" answer at the step S402 becomes greater than or equal to twice by the several executions of the processing of FIG. 8, the decision at the step S405 becomes "YES". This "YES" answer at the step S405 means that the temperature of the electromagnetic actuator 10 is yet greater than the threshold value $t_{th}$ although the temperature is decreasing as a result of the process at the step S407 (a first condition), or the process at the step S407 does not function to decrease the temperature of the electromagnetic actuator 10 (a second condition).

Therefore, when the decision at the step S405 is "YES", the routine proceeds to a step S408 wherein the controller 20 decides as to whether the counter ETC reaches a predetermined number $\eta$ or not. The predetermined number $\eta$ is a number obtained by dividing a predetermined time period for sufficiently cooling ( or radiating the heat of) the electromagnetic actuator 10 by an interruption interval although it is effected by the interruption interval of the processing of FIG. 8. When the decision at the step S408 is "NO", it is not yet clear which of the first and second conditions is caused. Accordingly, the present process of FIG. 8 is finished, and the routine returns to the vibration reducing process of FIG. 2.

Figure 9:
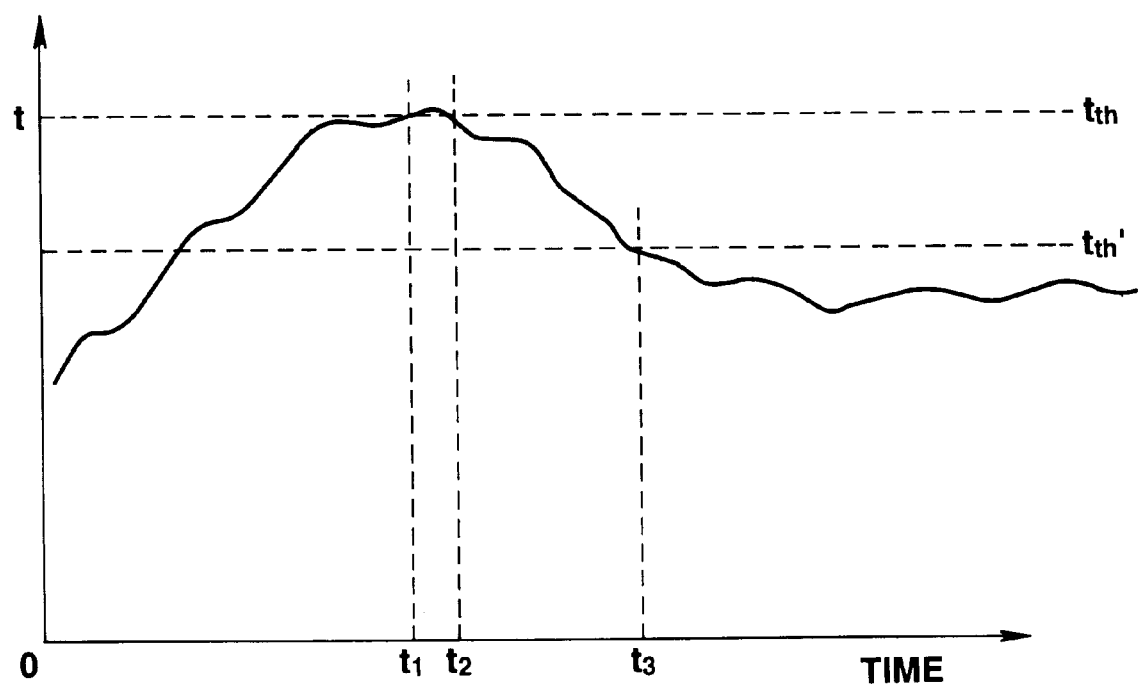
FIG. 9 is a graph which shows a change of the temperature of a magnetic actuator.

When the system is put in the first condition, the temperature detection signal t becomes smaller than the threshold value $t_{th}$ as at the time $t_2$ in FIG. 9 before the content of the counter ETC becomes $\eta$. Therefore, the decision at the step S402 becomes "NO". In contrast, when the system is put in the second condition, the temperature of the electromagnetic actuator 10 is not lowered within a short time period. Therefore, the decision at the step S402 becomes "YES" at a predetermined time, and the routine proceeds to the step S407 wherein a new upper limit value $W_{max}$ is obtained by again multiplying the correction coefficient $\epsilon$ with the present upper limit value $W_{max}$ ($W_{max} = W_{max} \times \epsilon$). After the execution of the step S407, the process of FIG. 8 is finished, and the routine returns to the vibration reducing process of FIG. 2.

By the execution of the steps S408, S409 and S407, when the temperature of the electromagnetic actuator 10 is kept at a high temperature, the upper limit value $W_{max}$ is gradually decreased. Therefore, the electric current flowing through the exciting coil 10b of the electromagnetic actuator 10 becomes small, and the temperature of the electromagnetic actuator 10 becomes is easily lowered.

In case that the decision at the step S402 becomes "NO" after it once became "YES", the content of the counter HTC is greater than 1. Therefore, the decision at the step S403 becomes "YES", and the routine proceeds to a step S410 wherein the controller 20 decides as to whether the temperature detection signal t is greater than another threshold value $t_{th}'$ which is smaller than the threshold value $t_{th}$. When the decision at the step S410 is "YES", the controller judges that the temperature of the electromagnetic actuator 10 is still high, and the process of FIG. 8 is finished.

However, when the temperature of the electromagnetic actuator 10 is further lowered so that the temperature detection signal t becomes smaller than the threshold value $t_{th}'$ as at a time $t_3$ of FIG. 9, the decision at the step S410 becomes "NO". Then, the routine proceeds to a step S411 wherein the controller 20 newly sets the previously stored upper limit value $HW_{max}$ at the step S406 as a new upper limit value $W_{max}$ ($W_{max} = HW_{max}$). Following this, the routine proceeds to a step S412 wherein the counter HTC is cleared. Then, the process of FIG. 8 is finished, and the routine returns to the vibration reducing process of FIG. 2.

By the execution of the process of FIG. 8, it becomes possible to detect the abnormality due to the high temperature of the electromagnetic actuator 10 and to decrease the temperature of the electromagnetic actuator 10 by decreasing the level of the drive signal y when the abnormality is detected. Therefore, the system operates without fatal trouble such as the burning of the exciting coil 10B.

Furthermore, the output of the drive signal y is not stopped even when the high temperature condition is solved. Therefore, the controlled vibration for reducing the vibration transferred to the device can be generated. This enables solving the high temperature trouble while the vibration reducing effect is ensured.

When the lowering of the temperature by the process at the step S408 is not sufficient, the level of the drive signal y is further decreased. Therefore, the high temperature condition is further securely solved.

After the lowering of the high temperature, the upper limit value $W_{max}$ is returned to an original value by the execution of the process at the step S411. Therefore, the level of the drive signal y is again increased to preferably perform the vibration reducing control.

On the other hand, the process of FIG. 10 is executed to detect the abnormality by the collision and to avoid the collision between the magnetic path member 12 and the electromagnetic actuator 10 when the abnormality is detected. The process of FIG. 10 is executed as an interruption processing by each process at the step S117 in the vibration decreasing process of FIG. 2.

First, at a step S501, the controller 20 reads the acceleration detection signal a from the acceleration sensor 24.

At a step S502, the controller 20 obtains a change amount $\Delta a$ of the acceleration detection signal a by subtracting the previous acceleration signal a(n−1) from the present acceleration detection signal a(n) ($\Delta a=a(n)-a(n-1)$).

At a step S503, the controller 20 decides as to whether the absolute value of the change amount $\Delta a$ is greater than a threshold value $a_{th}$ or not. When the decision at the step S503 is "NO", the controller 20 judges that the collision abnormality is not detected, and finishes the present process of FIG. 10.

In case of the engine mount 1 constructed as mentioned in the present embodiment, the resonance frequency of a vibration system constituted by the plate spring 11 and the magnetic path member 12 is set at a high frequency higher than the control range of the engine mount 1, such as at 200 Hz. Assuming that the vibration reducing control is effectively executed within a range from an engine idling range to the echo sound range in 5000–6000 rpm of the engine rotation speed, the largest vibration amplitude is generally the amplitude in the idling range although slightly changed according to the location of the engine mount 1. In this case, if the idle frequency and the resonance frequency of the vibration system are compared in amplitude wherein the magnetic path member 12 is most collisionable with the electromagnetic actuator 10 and the vibration system includes the magnetic path member 12, the amplitude at the resonance frequency is generally ten times that at the idle frequency. Since the sensibility thereof by vehicle occupants increases by the square of the frequency, the difference of the sensibility generally becomes a hundred times.

If the collision between the magnetic path member 12 and the electromagnetic actuator 10 is not detected at the frequency of the largest amplitude, that is, at the idling range, the collision is not generated in other frequency range. Therefore, the collision abnormality is first generated at the idling range.

The fact that the magnetic path member 12 collides with the electromagnetic actuator 10 indicates that a power other than the electromagnetic force is steppingly inputted to the magnetic path member 12. Therefore, if the magnetic path member 12 is resonated by the stepping input, the acceleration detection signal a amplified by the resonance becomes a hundred times the original detection signal at the idling range. That is, when the collision abnormality is generated, the large change of the acceleration detection signal a is detected as shown by a range within an ellipse in FIG. 11. Therefore, by setting the threshold value at a sufficiently large value, it becomes possible to decide that the collision abnormality is not generated in case that the decision at the step S503 is "NO", and to decide that the collision abnormality is generated when the decision at the step S503 is "YES".

When the decision at the step S503 is "YES", the routine proceeds to a step S504 wherein the counter MPC is incremented by 1 (MPC=MPC+1). Following this, the routine proceeds to a step S505 wherein the controller 20 decides as to whether the counter MPC is larger than 1 or not. When the decision at the step S505 is "NO", that is, when the collision abnormality is first detected, the routine proceeds to a step S506 wherein the alarm lamp is turned on such as turned to yellow. It will be understood that the fact that the collision abnormality has been generated may be stored in a predetermined memory of the controller 20 when the process at the step S506 is executed.

Then, the routine proceeds to a step S507 wherein the controller 20 changes the upper limit value into a new value which is obtained by multiplying the correction coefficient $\epsilon$ with the present upper limit value $W_{max}$ ($W_{max}=W_{max}\times\epsilon$). After the execution of the process of FIG. 10, the routine returns to the vibration reducing processing of FIG. 2.

With the process of FIG. 10, the level of the drive signal y is decreased, the vibration amplitude of the magnetic path member 12 is decreased, and the collision between the magnetic path member 12 and the electromagnetic actuator 10 is solved. Further, when the collision abnormality is not solved by one execution of the process at the step S507, the decision at the step S503 keeps "YES". Therefore, the processes at the steps S504 and S505 are executed, and the decision at the step S505 then becomes "YES". Following this, the routine proceeds to a step S507 wherein the upper limit value $W_{max}$ is again renewed by multiplying the correction coefficient $\epsilon$ and the present upper limit value $W_{max}$. That is, since the process at the step S507 is repeated until the collision abnormality is solved, the level of the drive signal y is decreased so as to firmly solve the collision abnormality.

Thus, by the execution of the process of FIG. 10, even if the collision abnormality is generated, it is firmly solved. Therefore, the generation of the strange sound due to the collision of the magnetic path member 12 and the electromagnetic actuator 10 is avoided. Further, since the collision between the magnetic path member 12 and the electromagnetic actuator 10 corresponds to inputting the stepping power for the vibration control, the vibration condition is degraded. However, by executing the process of FIG. 10, the degradation of the vibration is avoided.

Further, since the process of FIG. 10 is arranged so as not to stop the output of the drive signal y when the collision abnormality is detected, it is possible to obtain the most effective vibration reducing control as possible.

In the first embodiment of the present invention, since the various abnormalities are detected and the proper counter process (maneuver) for each abnormality is executed according to each generated abnormality, the bad influence thereby is suppressed. Therefore, the reliability of the system is improved.

The control for actively displacing the magnetic path member 12 is not executed after the execution of the process at the step S203 of FIG. 4 or S305 of FIG. 5. Therefore, the dynamic spring constant of the engine mount 1 becomes high due to the fluid in the fluid chamber 15, and it may cause degradation of the vibration characteristics as compared with the conventional engine. Accordingly, in case that the vibration characteristics are degraded, the fluid in the fluid chamber 15 is discharged through the conduit 26 by opening the valve 27 so as to avoid the dynamic spring constant of the engine mount 1 from extremely increasing. Therefore, the degradation of the vibration is avoided and the reliability of the system is improved. Further, if ethylene-glycol is used as fluid in the fluid chamber 15, the discharge thereof becomes safe and does not generate trouble.

Furthermore, in case that the drive signal y is generated by the execution of the adaptive process according to the adaptive algorithm, the generation of the abnormality possibly causes the divergence of the control. However, by correcting the upper limit value $W_{max}$ into a smaller value in the event of the generation of the abnormality, the maximum value of the drive signal y is limited and the possibility of the divergence of the control is decreased. Therefore, the reliability of the system is further improved.

In the first embodiment, the control means is constituted by the processing shown in FIG. 2, the control disabling means as the control changing means is constituted by the process of the step S203 and the step S305, the movable member condition detecting means as the abnormality detecting means is constituted by the acceleration sensor 24 and the process of the steps S204 to S206, the temperature abnormality detecting means as the abnormality detecting means is constituted by the temperature sensor 25 and the processing at the steps S401–S405, S408 and S409, the level reducing means and the maximum value limiting means as the control changing means is constituted by the process at the step S407, the collision detecting means as the abnormality detecting means is constituted by the acceleration sensor 24 and the processing at the steps S501–S503, the level reducing means as the control changing means is constituted by the process of the steps S507, and the fluid discharging mechanism as the dynamic spring constant changing means is constituted by the conduit 26 and the valve 27.

Figure 12:
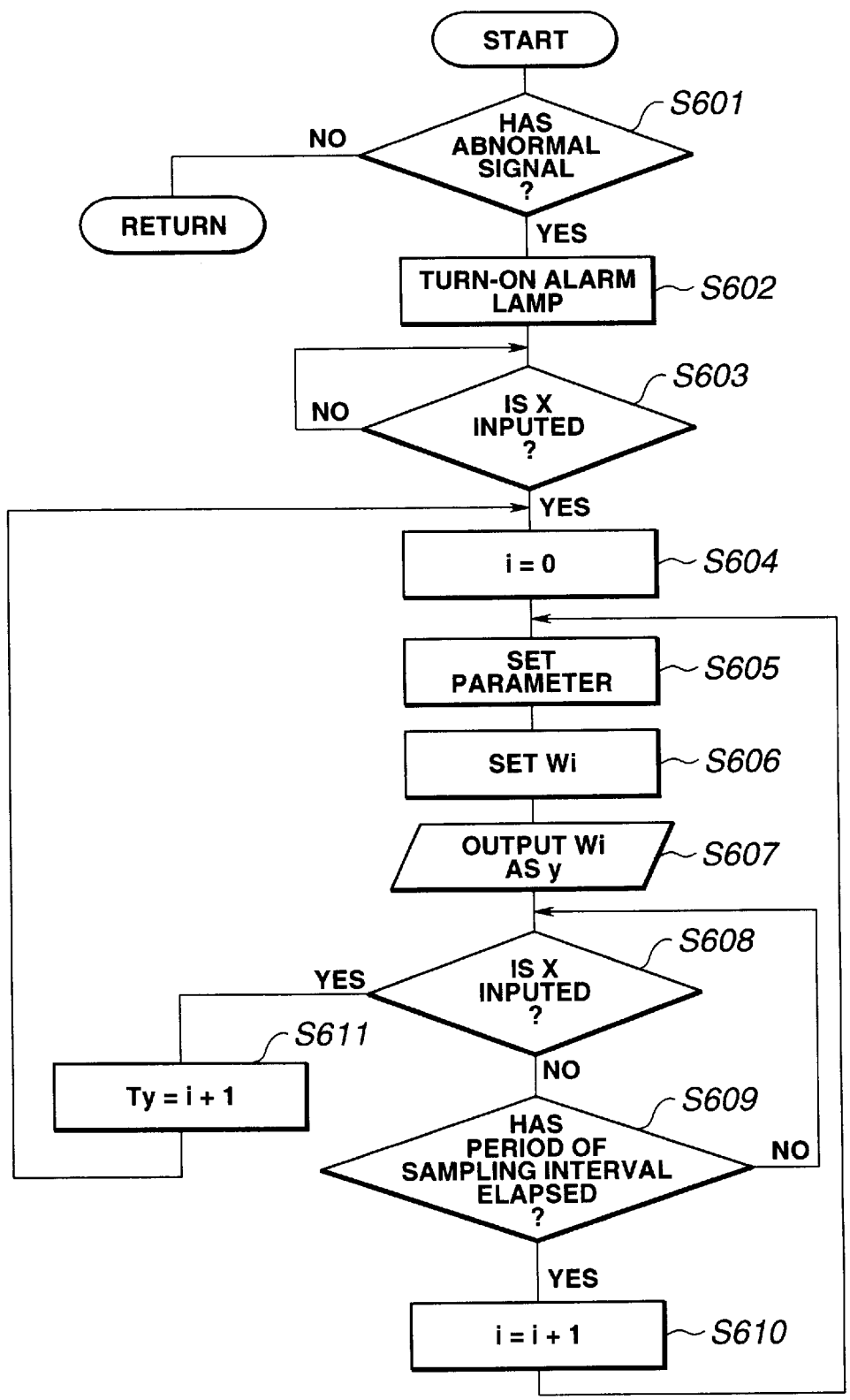
FIG. 12 is a flowchart which shows a process executed by the controller of a second embodiment of the vibration insulating device according to the present invention.
Figure 13:
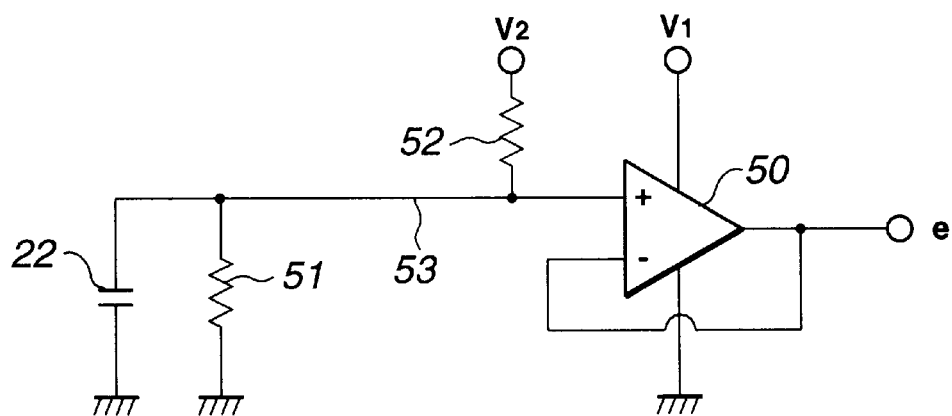
FIG. 13 is a circuit diagram for detecting the breaking of a signal wire.

Referring to FIGS. 12 to 14, there is shown a second embodiment of the vibration insulating device according to the present invention. The construction and the vibration reducing control of the second embodiment are basically the same as those of the first embodiment. Therefore, the explanations thereof are omitted herein.

The second embodiment is arranged to execute the process for detecting the abnormality that the necessary residual vibration signal e can not be obtained in case that the vibration reducing control according to the adaptive algorithm is executed. Further, the second embodiment is arranged to generate the controlled vibration for decreasing the vibration from the engine 30 even when the signal indicative of the abnormality is detected.

The process shown in FIG. 12 is an interruption control processing executed at each predetermined time during the execution of the vibration reducing process of FIG. 2.

At a step S601, the controller 20 decides as to whether the signal abnormality that the residual vibration signal e is not supplied to the controller 20 is generated or not. The signal abnormality is most possibly caused by the breaking of a wire for connecting the acceleration sensor 22 and the controller 20. Accordingly, by detecting the breaking of the wire, the detection of the signal abnormality is smoothly executed. As a method for detecting the breaking of the wire, various methods have been proposed. For example, as shown in FIG. 13, a resistor 51 is disposed in parallel with the acceleration sensor 22 which is connected to a non-inverted input side of an amplifier 50 in the controller 20. A resistor 52 connected to an electric source $V_2$ is connected to the non-inverted input side of the amplifier 50. The values of the resistors 51 and 52 are equal, the resistor 51 is disposed in the vicinity of the signal wire 53 of the acceleration sensor 22, and the resistor 52 is disposed in the vicinity of the signal wire 53 of the amplifier 50. Further, the output of the amplifier 50 is feedbacked to the inverted input side of the amplifier 50.

With the thus arranged vibration insulating device, the residual vibration signal e outputted from the amplifier 50 becomes a signal obtained by superimposing the output of the acceleration sensor 22 on the ($V_2/2$) if the signal wire is not broken. If the breaking of the signal wire has occurred, the residual vibration signal e becomes $V_2$. Accordingly, by adopting the structure shown in FIG. 13 as the breaking detection method of the second embodiment, the detection of the signal abnormality can be executed by monitoring at the step S601 of FIG. 12 as to whether the residual vibration signal e corresponds with $V_2$ or not. When the decision at the step S601 is "NO", the signal abnormality is not generated. Therefore, the present process of FIG. 12 is finished and the routine returns to the vibration reducing process of FIG. 2. When the decision at the step S601 is "YES", the residual vibration signal e can not be obtained. Therefore, the controller 20 judges that it is impossible to execute the vibration reducing processing of FIG. 2 by using the residual vibration signal e, and the routine proceeds to a step S602.

At the step S602, the alarm lamp is turned on such as turned yellow in order to inform that the abnormality is generated. It will be understood that the controller 20 may be arranged to store the fact that the signal abnormality is generated when the processing at the step S602 is executed. Following this, at a step S603 the controller 20 awaits the input of the new reference signal x.

At a step S604, the controller 20 rests the counter i (i=0).

At a step S605, the controller 20 sets the present engine rotation speed and the engine load as parameters. The engine rotation speed may be obtained from the newest output frequency Ty, or from an engine rotation speed sensor if installed therein. Further, the engine load may be obtained from the intake negative pressure of the engine 30.

Figure 14A:
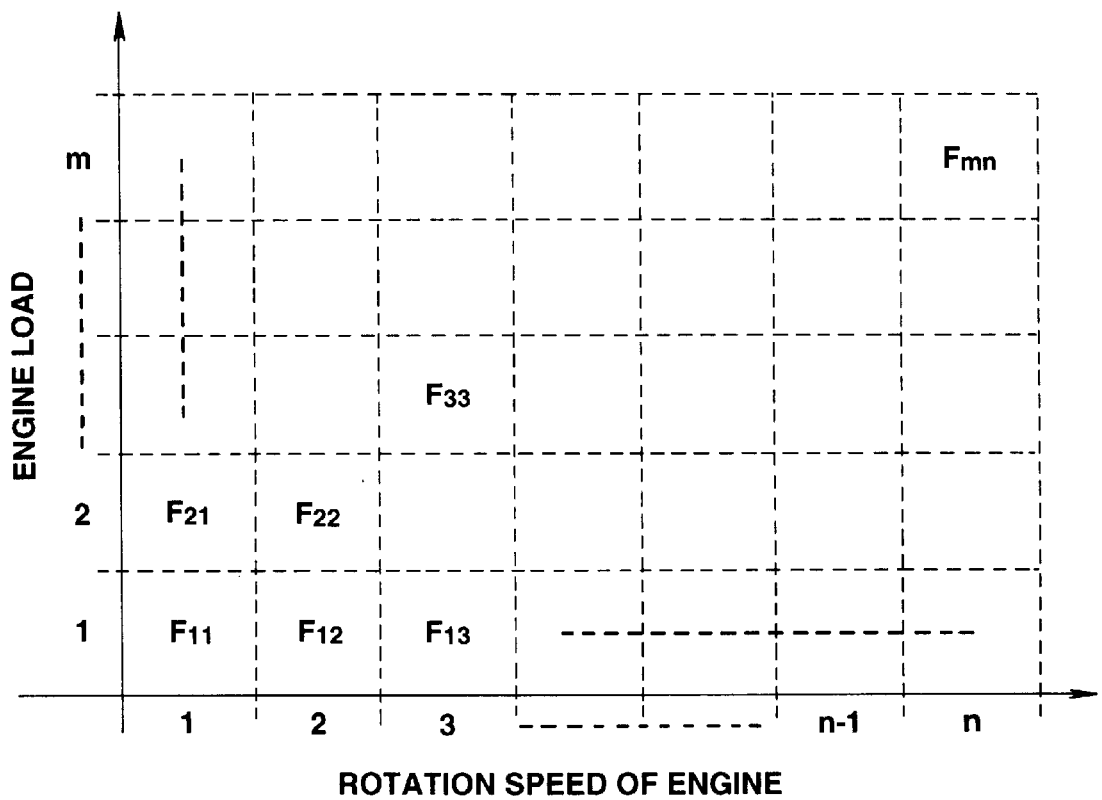
FIGS. 14A and 14B are views for explaining the map control of the second embodiment.
Figure 14B:
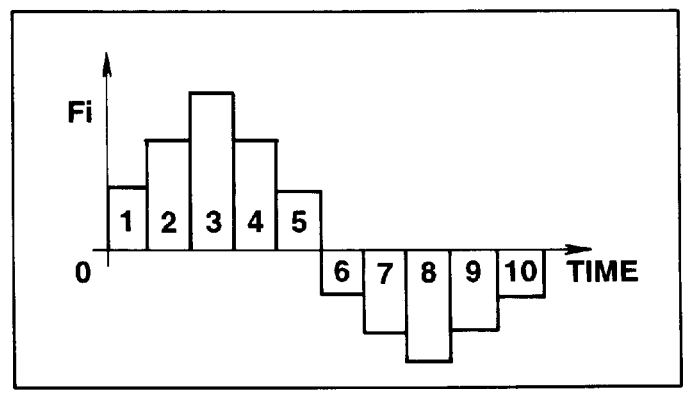

At a step S606, the controller 20 sets the filter coefficient $W_i$ by selecting it from the map. More particularly, referring to the map where the engine rotation speed and the engine load are previously set as the parameters as shown in FIG. 14A, the numeral train F stored in a corresponding address as shown in FIG. 14B is read out, and the value $F_i$ at the i-th order of the numeral train F is set as the filter coefficient $W_i$. The address of the map shown in FIG. 14A is, for example, constructed (n×m) blocks by dividing the engine rotation speed into predetermined ranges of n by predetermined range such as 100 rpm and by dividing the engine load range into predetermined ranges of m by a predetermined range. Even if the number of the divisions is increased, the difference between each numeral train is not so increased while the memory capacity to be necessary is largely increased.

At a step S607, the controller 20 outputs the filter coefficient $W_i$ as the drive signal y.

At a step S608, the controller 20 decides as to whether the reference signal x is inputted or not. When the decision at the step S608 is "NO", the routine proceeds to a step S609 wherein it is judged as to whether a time period corresponding to an interval of a sampling clock (output interval of the drive signal y) has elapsed or not. When the decision at the step S608 is "NO", the routine returns to the step S608 to repeat the processing of the step S608. When the decision at the step S609 is "YES", the routine proceeds to a step S610 wherein the counter i is incremented by 1 (i=i+1). Following this, the routine returns to the step S605. Assuming that the engine rotation speed and the engine load do not change within an extremely short time, the flowchart of FIG. 12 may be arranged so that the routine returns from the step S610 to the step S606.

When the controller 20 confirms the input of the reference signal x at the step S608, the routine proceeds to a step S611 wherein the content of the counter i, more particularly, a value (i+1), is stored as the newest output frequency Ty. Following this, the routine returns to the step S604.

By the execution of the above-mentioned process, the map control is executed, and the drive signal y is in turn outputted at the intervals of the sampling clock if the adaptive algorithm is not used. Therefore, even if the signal abnormality that the residual vibration signal e is not inputted is caused, the vibration reducing effect is ensured. This improves the reliability of the system.

Particularly, in this embodiment, the engine rotation speed and the engine load are used as the parameters of the map control. By determining the parameters, the vibration inputted from the engine 30 is generally determined. Although such controlled level is not preferable to that obtained by the adaptive algorithm, it ensures vibration reducing effect in some degree. Further, the temperature of the electromagnetic actuator 10, the total drive time of the engine mount 1, the total drive time of the engine mount 1 in the idle range and the travel distance of the vehicle may be obtained as parameters so as to correct the content of the numeral train F read from the map according to these parameters. This further improves the vibration reducing effect as compared with that in the case of the vibration control by the adaptive algorithm.

In this second embodiment, the map control means functioning as the control changing means is constituted by the process of the steps S603–S611, and the signal abnormality detecting means is constituted by the process of the step S601 and the circuit shown of FIG. 13.

Further, to maintain the accuracy of the map as much as possible, a map updating means may be constructed by obtaining the engine rotation speed and the engine load at the finish of the process of the step S117 in the vibration reducing process of FIG. 2, and by updating the numeral train F corresponding to the address according to the obtained engine rotation speed and the engine load by using the newest filter coefficient $W_i$ at this time. This further improves the vibration reducing effect by the map control and improves the reliability of the system.

Figure 15:
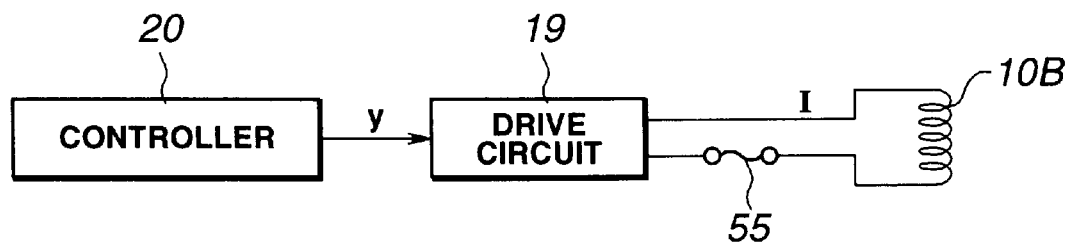
FIG. 15 is a circuit diagram which shows a structure of an essential part in a third embodiment of the vibration insulating device according to the present invention.

Referring to FIG. 15, there is shown a third embodiment of the vibration insulating device according to the present invention. The construction and the vibration reducing control of the third embodiment are basically the same as those of the first embodiment. Therefore, the explanation thereof is omitted herein.

In this embodiment, a fuse 55 is further installed in a wire between the exciting coil 10B and a drive circuit 19 for supplying an electric current I as the drive signal to the exciting coil 10B.

With the thus arranged controlled vibration insulating device, if the overcurrent flows through the exciting coil 10B due to some abnormality, the fuse 55 is blown out and the wire is broken. Therefore, the electric current I is not supplied to the exciting coil 10B, and the electromagnetic force by the electromagnetic actuator 10 is not generated. That is, a control forbidden condition is invited. Accordingly, the fuse 55 installed to the wire detects the abnormality due to the overcurrent and forbids the supply of the electric current I to the exciting coil 10B after detecting the abnormality.

By the function of the fuse 55, even if some overcurrent flows through the exciting coil 10B, the breaking of the electromagnetic actuator 10 is prevented and the execution of the unavailable control after the generation of the abnormality. Therefore, the bad influence due to the generation of the abnormality is suppressed, and the reliability of the system is improved. Furthermore, since only the fuse 55 is added to the construction of the first embodiment, a large merit in cost is ensured. In this third embodiment, the fuse 55 corresponds to the abnormality detecting means and the control changing means.

Figure 16A:
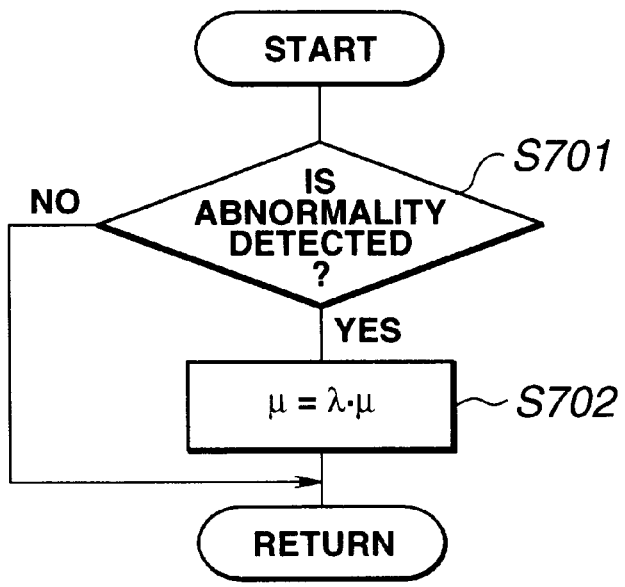
FIGS. 16A and 16B are flowcharts which show a process executed by the controller of a fourth embodiment of the vibration insulating device according to the present invention.
Figure 16B:
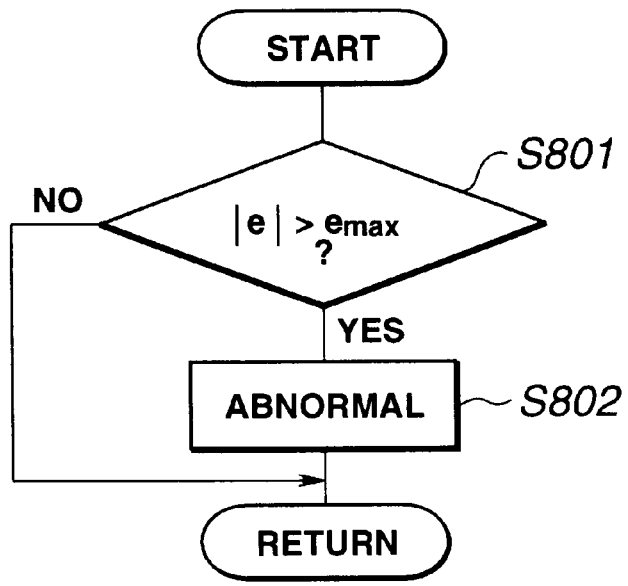

Referring to FIGS. 16A and 16B, there is shown a fourth embodiment of the vibration insulating device according to the present invention. The construction and the vibration reducing control of the fourth embodiment are the same as those of the first embodiment. Therefore, the explanation thereof omitted herein.

The process shown in FIG. 16A is an interruption processing executed at each predetermined time during the execution of the vibration reducing processing of FIG. 2.

At a step S701, the controller 20 decides as to whether the abnormality is detected by the above-mentioned abnormality detection processing or not. When the decision at the step S701 is "NO", the process of FIG. 16A is finished. When the decision at the step S701 is "NO", the routine proceeds to a step S702 wherein the multiple of the present convergence coefficient $\mu$ and the correction coefficient $\lambda$ which is larger than 0 and smaller than 1 such as 0.9 is set as a new convergence coefficient $\mu$ ($\mu=\lambda\cdot\mu$). Then, the processing of FIG. 16A is finished.

With the execution of this processing, when the abnormality is generated the magnitude of the convergence coefficient $\mu$, which affects the adaptive speed in the updating processing of the filter coefficient $W_i$, is decreased. Therefore, the stability of the system increases although the adaptive speed is decreased. Accordingly, even during the abnormality generating time when the system tends to go unstable, the divergence of the control is suppressed and therefore the reliability of the system is improved. Further, since only the changing of the convergence coefficient $\mu$ is executed, the processing is kept simple.

If the system is arranged to detect that the system tends to go divergent, it becomes possible to suppress the demerit that the adaptive speed is decreased by decreasing the convergence coefficient $\mu$. The processing of FIG. 16B shows a typical processing for detecting the divergence tendency of the control. The processing of FIG. 16B is executed as an interruption process by each execution of the process at the step S105 of FIG. 2.

At a step S801, the controller 20 decides as to whether or not the absolute value of the residual vibration signal e is greater than the upper limit $e_{max}$ for judging the divergence tendency. That is, when the control tends to be divergent, the residual vibration signal e is increased according to the increase of the drive signal y. Therefore, by monitoring the level of the residual vibration signal e, it becomes possible to judge as to whether the control tends to be divergent or not. When the decision at the step S801 is "NO", the present process of FIG. 16B is finished. When the decision at the step S801 is "YES", the controller 20 judges that the control tends to be divergent. Therefore, the routine proceeds to a step S802 wherein the divergent condition of the control is stored in the memory of the controller 20. Then, the process of FIG. 16B is finished.

When the abnormality is detected in the process of FIG. 16B, the process of FIG. 16A is executed to decrease the magnitude of the convergence coefficient $\mu$. Therefore, the updated amount of the convergence coefficient $\mu$ is decreased and the divergence of the control is suppressed. Further, if the divergence is not suppressed even by this process, the process of FIG. 16A is repeatingly executed so as to gradually decrease the convergence coefficient $\mu$. When the suppression of the divergence is confirmed from the level of the residual vibration signal e, the magnitude of the convergence coefficient μ may be returned to the original value.

Herein, the coefficient changing means as the control changing means is constituted by the process at the step S702 and the divergence estimating means is constituted by the acceleration sensor 22 and the process of the step S801.

Although the first to fourth embodiments of the vibration insulating device according to the present invention have been shown and described to be applied to the engine mount 1 for supporting the engine 30, it will be understood that the application of the present invention is not limited to the engine mount 1 and may be applied other devices such as a vibration insulating device for machine tools.

While each of the abnormality detection process and the counterplan process mentioned above may be applied to each embodiment or each processing, these processes may be combined with each other and used in each embodiment.

It is to be understood that the execution timing of the abnormality detection process and the maneuver process are not limited to the interruption process and may be properly changed according to the processing ability of the controller 20. For example, as to a highly generative abnormality its detection process is executed at short intervals, and as to the low-possibly generative abnormality its detection process is executed at relatively long intervals.

Although the above mentioned embodiments have been shown and described such that the drive signal y is generated according to the synchronized type Filtered-X LMS algorithm, it will be understood that the adapted algorithm may not be limited to this and may be a conventional Filtered-X LMS algorithm or LMS algorithm within the frequency range. Further, if the characteristic of the system is stable, the combination control of a conventional feed-forward control according to the reference signal x and a conventional feedback control according to the residual vibration signal e may be executed without using the adaptive algorithm of LMS algorithm and the like. For example, the drive signal y is generated by filter-processing the reference signal x through a coefficient fixed digital filter or analog filter, and the phase of the drive signal y is controlled so as to decrease the residual vibration signal e.

While the above preferred embodiments have been shown and described as to a vibration insulating device of a fluid sealed type and electromagnetic drive type, it will be understood that the present invention is not limited to this type and may be a type utilizing a piezoelectric actuator. Further, although in the embodiments the vibration insulating effect is obtained by utilizing the fluid resonance generated when the fluid passes through the orifice 5a during the low frequency vibration input, the orifice construction member 5 and the diaphragm 4 and the like may be omitted from the system in case that the vibration insulating device according to the present invention supports a vibrating member which does not generate the low frequency vibration. That is, in such case, the parts may be decreased to reduce the production cost.

Although the preferred embodiments have been shown and described to be equipped with the leakage sensor 23, the acceleration sensor 24 and the temperature sensor 25 for detecting the abnormalities, the abnormality detection method may not be limited to these sensors and the other various method may be applied to the vibration insulating device according to the present invention. For example, in order to detect that the magnetic path member 12 can be displaced, noting that the impedance of the exciting coil 10B is varied to form a sine wave shape for one cycle of the vibration of the magnetic path member 12, it becomes possible to confirm the operation of the magnetic path member 12 by obtaining the impedance at the upper and lower peak points of the amplitude of the magnetic path member 12. Further, since the impedance of the exciting coil 10B is varied by the change of the temperature of the electromagnetic actuator 10, it is possible to detect the temperature of the electromagnetic actuator 10 according to the change of the impedance.

What is claimed is:

1. A vibration insulating device for reducing vibration of a structural member caused by a motor, said vibration insulating device comprising:

a controlled vibration generating device for generating controlled vibration according to a drive signal, the controlled vibration functioning to reduce vibration of the structural member caused by the motor;

a reference signal generating means for detecting a vibrating condition of said controlled vibration generating device and for outputting a reference signal indicative of the vibrating condition;

a residual vibration detecting means for detecting a residual vibration of the structural member and for outputting a residual vibration signal indicative of the residual vibration;

a controlling means for generating the drive signal for driving the controlled vibration generating device according to the reference signal and the residual signal so as to reduce the vibration of the structural member;

an abnormality detecting means for detecting an abnormality of said controlled vibration generating device; and a control changing means for changing an operating condition of said controlling means according to a detection result of said abnormality detecting means.

2. A vibration insulating device as claimed in claim 1, further comprising a control disabling means for disabling operation of said controlling means.

3. A vibration insulating device as claimed in claim 2, wherein said abnormality detecting means includes an operational abnormality detecting means for outputting a signal indicative of abnormality of said controlled vibration generating device when insulation from the vibration from the motor cannot be ensured even though the drive signal is generated, said control disabling means disabling the operation of said controlling means when the operational abnormality detecting means detects abnormality.

4. A vibration insulating device as claimed in claim 2, wherein said controlled vibration generating device is of a fluid filled type wherein fluid for transmitting controlled vibration is contained in a sealed housing of said controlled vibration generating device, wherein said abnormality detecting means includes a leakage detecting means for outputting a signal indicative of abnormality of said controlled vibration generating device when leakage of the fluid is detected, and wherein said control disabling means disables control by said controlling means when the leakage detecting means detects abnormality.

5. A vibration insulating device as claimed in claim 2, wherein said controlled vibration generating device is of an electromagnetic drive type including a movable plate comprised of a magnetizable elastically supported member and further including an electromagnetic actuator for displacing the movable plate according to the drive signal, wherein said abnormality detecting means further includes a moveable plate abnormality detecting means for outputting a signal indicating that the movable plate cannot be displaced according to the drive signal, and wherein said control disabling means disables control by said controlling means when the movable plate abnormality detecting means detects an abnormality of the movable plate.

6. A vibration insulating device as claimed in claim 1, wherein said control changing means includes a level reducing means for reducing the level of the drive signal.

7. A vibration insulating device as claimed in claim 6, wherein said control changing means includes a high temperature detecting means for outputting a signal indicative of the abnormality of said controlled vibration generating device when the temperature of said controlled vibration generating device is higher than a predetermined temperature, and wherein said level reducing means reduces the level of the drive signal when said high-temperature abnormality detecting means outputs a signal indicative of the abnormality.

8. A vibration insulating device as claimed in claim 6, wherein said controlled vibration generating device includes a movable plate comprising a magnetizable and elastically supported member and further includes an electromagnetic actuator for displacing the movable plate according to the drive signal, and wherein said abnormality detecting means includes a collision detecting means for outputting a signal indicative of an abnormality of said controlled vibration generating device when the movable plate collides with the electromagnetic actuator, and wherein said level reducing means reduces the level of the drive signal in accordance with a signal from said collision detecting means.

9. A vibration insulating device as claimed in claim 1, wherein said control changing means includes a map controlling means for executing a map control to determine the drive signal according to a predetermined parameter and a map.

10. A vibration insulating device as claimed in claim 9, wherein said abnormality detecting means includes a signal abnormality detecting means for outputting a signal indicative of a residual vibration signal abnormality when the residual vibration signal is not inputted to said controlling means, said map controlling means providing the further function of executing the map control when the signal abnormality detecting means detects a residual vibration signal abnormality.

11. A vibration insulating device as claimed in claim 9, wherein the motor comprises a vehicle engine and the structural member comprises a vehicle body, and wherein the predetermined parameter includes at least one of engine rotation speed, engine load, a temperature of the controlled vibration generating device, a total drive time of the controlled vibration generating device, a total drive time of said controlled vibration generating device in the idling range, and a travel distance of the vehicle.

12. A vibration insulating device as claimed in claim 9, further comprising a map updating means for updating content of the map when the abnormality detecting means does not detect an abnormality.

13. A vibration insulating device as claimed in claim 1, wherein the drive signal is outputted in the form of an electric current, and wherein the abnormality detecting means and the control changing means comprise a fuse installed in a line through which the electric current flows.

14. A vibration insulating device as claimed in claim 1, wherein said controlling means includes an adaptive processing means for executing an adaptive process according to an adaptive algorithm and for generating the drive signal for the controlled vibration generating device, and wherein said control changing means includes a maximum value limiting means for limiting a maximum value of the drive signal when the abnormality detecting means detects an abnormality.

15. A vibration insulating device for reducing vibration of a structural member caused by a motor, said vibration insulating device comprising:

a controlled vibration generating device for generating controlled vibration according to a drive signal, said controlled vibration generating device including a dynamic spring constant changing means for changing a dynamic spring constant thereof, the controlled vibration functioning to reduce vibration of the structural member caused by the motor;

a reference signal generating means for detecting a vibrating condition of said controlled vibration generating device and for outputting a reference signal indicative of the vibrating condition;

a residual vibration detecting means for detecting a residual vibration of the structural member and for outputting a residual vibration signal indicative of the residual vibration;

a controlling means for generating the drive signal for driving the controlled vibration generating device according to the reference signal and the residual signal so as to reduce the vibration of the structural member;

an abnormality detecting means for detecting an abnormality of said controlled vibration generating device; and a control changing means for changing an operating condition of said controlling means according to a detection result of said abnormality detecting means.

16. A vibration insulating device as claimed in claim 15, wherein said controlled vibration generating device comprises a fluid filled sealed housing, and wherein said dynamic spring constant changing means includes a fluid discharging mechanism for discharging the fluid.

17. A vibration insulating device as claimed in claim 16, wherein said controlling means includes an adaptive processing means for executing an adaptive process according to an adaptive algorithm and for generating the drive signal for the controlled vibration generating device, and wherein said dynamic spring constant changing means includes a coefficient changing means for changing the magnitude of a coefficient which affects an adaptive speed of the adaptive processing means.

18. A vibration insulating device as claimed in claim 17, wherein said abnormality detecting means includes a divergence estimating means for outputting a signal indicative of an abnormality when the level of the residual vibration signal is higher than a predetermined level and tends to diverge, and wherein said coefficient changing means changes the magnitude of the coefficient to decrease the adaptive speed when the divergence estimating means detects an abnormality.

19. A vibration insulating device for reducing vibration of a structural member caused by a motor, said vibration insulating device comprising:

controlled vibration generating device, including a fluid filled chamber changed in volume by the displacement of a movable plate which is moved by an electromagnetic actuator, for generating controlled vibration according to a drive signal, the controlled vibration functioning to reduce vibration of the structural member caused by the motor;

a reference signal generating means for detecting an operating condition of said controlled vibration generating device and for outputting a reference signal;

a residual vibration detecting means for detecting a residual vibration of the structural member and for outputting a residual vibration signal;

a controlling means for generating the drive signal according to the reference signal and the residual signal so as to reduce the vibration of the structural member;

an abnormality detecting means including an operational abnormality detecting means for outputting a signal indicative of abnormality of said controlled vibration generating device when the insulation of vibration from the motor cannot be ensured even though the drive signal is generated, a leakage detecting means for outputting a signal indicative of abnormality of said controlled vibration generating device when leakage of the fluid is detected, and a plate condition detecting means for outputting a signal indicative of abnormality of said controlled vibration generating device when the movable plate cannot displace according to the drive signal;

a control changing means for changing an operating condition of said controlling means according to a detection result of said abnormality detecting means; and a control disabling means for disabling the operation of said controlling means when at least one of the operational abnormality detecting means, the leakage detecting means and the plate condition detecting means detects abnormality.

20. A vibration insulating device for reducing vibration of a structural member of an automotive vehicle, caused by an engine of the automotive vehicle the vibration insulating device comprising:

an installation part connected to the engine;

a supporting elastomer connected to said installation part;

an outer cylinder connected to said supporting elastomer;

a fluid chamber defined by said supporting elastomer and said outer cylinder;

an auxiliary fluid chamber in fluid communication with said fluid chamber through an orifice, a volume of said auxiliary fluid chamber being changeable;

an orifice connected to said fluid chamber and said auxiliary fluid chamber;

a movable member defining said fluid chamber, said movable member being displaceable to change the volume of said fluid chamber, said movable member having a nonlinear spring characteristic, said movable member being connected to said structural member;

said fluid chamber, said orifice and said auxiliary fluid chamber being sealed and filled with fluid;

an elastic member elastically supporting said movable member so as to be displaced to change the volume of said fluid chamber, said elastic member having a nonlinear spring characteristic;

an actuator for generating a displacement force for displacing said movable plate;

abnormality detecting sensors for detecting abnormality of the device and for outputting signals indicative of generation of the abnormality; and a controller for controlling the operation of said actuator so as to reduce vibration of the structural member caused by the engine and, for stopping the operation of said actuator and for turning on an alarm lamp to indicate an abnormality of the device to an operator of the device when said controller receives a signal indicative of an abnormality from said abnormality detecting sensors.

21. A method for operating an active engine mount, comprising:

detecting a temperature of fluid of a fluid filled sealed housing of said engine mount;

generating a signal indicating said temperature; and responsive to said signal, disabling a drive signal provided to a controlled vibration generating device for generating controlled vibration of said engine mount.

22. A vibration insulating device for reducing vibration of a structural member of an automotive vehicle caused by an engine of the automotive vehicle, the vibration insulating device comprising;

an installation part connected to the engine;

a supporting elastomer connected with said installation part;

an outer cylinder connected to said supporting elastomer;

a fluid chamber defined by said supporting elastomer and said outer cylinder;

an auxiliary fluid chamber in fluid communication with said fluid chamber through an orifice, a volume of said auxiliary fluid chamber being changeable;

a movable member defining said fluid chamber, said movable member being displaceable to change the volume of said fluid chamber, said movable member having a nonlinear spring characteristic;

an actuator for generating a displacement force for displacing said movable member;

an installation member connected to the structural member of the vehicle;

an abnormality detecting device for detecting abnormality of the device and for outputting signals indicative of the abnormality;

a drive circuit for supplying a control electric current to said actuator when receiving a drive signal;

a pulse generator installed to the engine for generating a reference signal synchronized with the rotation of a crank shaft of the engine;

a residual vibration detecting device fixed to the structural member for detecting a vibration condition of the structural member; and a controller for controlling the operation of said actuator so as to reduce vibration of the structural member caused by the engine, and for outputting the drive signal to said drive circuit on the basis of the reference signal from said pulse generator and a residual signal indicative of the vibration condition of the structural member from said residual vibration detecting device, said controller changing a generation of the drive signal when said controller receives the signal indicative of an abnormality from said abnormality detecting device.

23. A vibration insulating device for reducing vibration of a structural member of an automotive vehicle caused by an engine of the automotive vehicle, the vibration insulating device comprising:

an installation part connected to the engine;

an inner cylinder connected to said installation part;

a diaphragm disposed inside of said inner cylinder and clamped between said installation part and said inner cylinder;

a supporting elastomer connected to said inner cylinder;

an outer cylinder connected to said supporting elastomer;

an orifice installed inside of said inner cylinder;

a fluid chamber defined by said supporting elastomer;

an auxiliary fluid chamber in fluid communication with said fluid chamber through said orifice, a volume of said auxiliary fluid chamber being changeable, said fluid chamber, said orifice and said auxiliary fluid chamber being filled with fluid;

a movable member defining said fluid chamber;

a plate spring elastically supporting said movable member so as to be displaced to change the volume of said fluid chamber, said plate spring having a non-linear spring characteristic;

an actuator for generating a displacement force for displacing said movable member;

an actuator case fittingly receiving said actuator, said actuator case and said outer cylinder clamping said movable member;

an installation bolt projecting from said actuator case, said installation bolt connected with the structural member of the vehicle;

abnormality detecting sensors for detecting abnormality of the device and for outputting signals indicative of the abnormality;

a drive circuit for supplying a control electric current to said actuator when receiving a drive signal;

a pulse generator installed to the engine and generating a reference signal synchronized with the rotation of a crank shaft of the engine;

an acceleration sensor fixed to the structural member and detecting a vibration condition of the structural member; and a controller for controlling the operation of said actuator so as to reduce vibration of the structural member caused by the engine and for outputting the drive signal to said drive circuit on the basis of the reference signal from said pulse generator and a residual signal indicative of the vibration condition of the structural member from said acceleration sensor, said controller changing a generation of the drive signal when said controller receives the signal indicative of an abnormality from said abnormality detecting sensors.

* * * * *